United States Patent [19]

Iwata

[11] Patent Number: 6,026,077
[45] Date of Patent: Feb. 15, 2000

[54] FAILURE RESTORATION SYSTEM SUITABLE FOR A LARGE-SCALE NETWORK

[75] Inventor: Atsushi Iwata, Tokyo, Japan

[73] Assignee: NEC Corporation, Tokyo, Japan

[21] Appl. No.: 08/967,045

[22] Filed: Nov. 10, 1997

[30] Foreign Application Priority Data

Nov. 8, 1996 [JP] Japan ................................ 8-296218

[51] Int. Cl.$^7$ ........................ H04L 12/28; G01R 31/08; H04B 3/38
[52] U.S. Cl. ........................ 370/254; 370/225; 340/827
[58] Field of Search .................................. 370/254, 255, 370/238, 225, 228, 400, 389, 216, 217, 221, 227; 340/827

[56] References Cited

U.S. PATENT DOCUMENTS

| | | | |
|---|---|---|---|
| 5,223,968 | 6/1993 | Stringer et al. | 359/169 |
| 5,457,689 | 10/1995 | Marvit et al. | 370/449 |
| 5,646,936 | 7/1997 | Shah et al. | 370/228 |
| 5,838,660 | 11/1998 | Croslin | 370/216 |
| 5,943,314 | 8/1999 | Croslin | 370/216 |

*Primary Examiner*—Ajit Patel
*Assistant Examiner*—Brian Nguyen
*Attorney, Agent, or Firm*—Sughrue, Mion, Zinn Macpeak & Seas, PLLC

[57] ABSTRACT

In a failure restoration system comprising a distributed hierarchical routing section which is adapted to set up a main path and previously determine an alternate path for the main path in a network, an alternate path selection section is adapted to obtain complete source route information for the main path when it attempts to set up the main path. The alternate path selection section adds the complete source information to a SETUP signaling message for setting up the alternate path, thereby provides a physical alternate path as much different as possible from the main path.

10 Claims, 20 Drawing Sheets

───── HIERARCHICAL SOURCE ROUTE INFORMATION DESIGNATED BY SETUP (A.1, A.2, A.3, A, B, D,)

──── MAIN PATH ACTUALLY ESTABLISHED BY SETUP (A.1, A.2, A.3, A, B.1, B.2, B.4, D.1, D.2, D.3)

------ ALTERNATE PATH CANDIDATES SHARING NO PHYSICAL NODE/ PHYSICAL LINK WITH MAIN PATH

○ DEFAULT NODE ⸺ DEFAULT PHYSICAL LINK
☺ DUPLICATED NODE ⸺ DUPLICATED PHYSICAL LINK
⊘ VIRTUAL NODE ------- VIRTUAL LINK

FIG.15

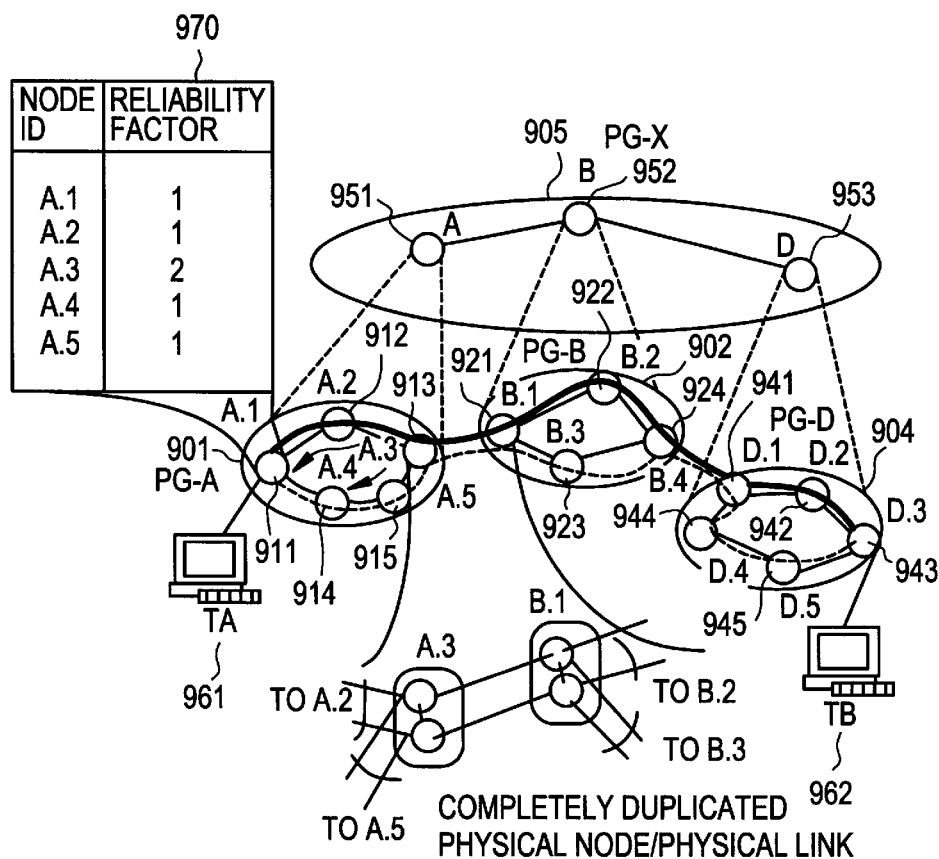

——— HIERARCHICAL SOURCE ROUTE INFORMATION DESIGNATABLE WITH SETUP
(A.1, A.2, A.3, A, B, D)

▬▬▬ MAIN PATH ACTUALLY DESIGNATED WITH SETUP
(A.1, A.2, A.3, A, B.1, B.2, B.4, D.1, D.2, D.3)

------ CANDIDATE OF ALTERNATE PATH THAT DOES NOT PASS THROUGH
COMMON PHYSICAL NODES/ PHYSICAL LINKS WITH MAIN PATH

——▶ EACH PHYSICAL NODE IN PEER GROUP FLOODS RELIABILITY FACTOR
INDICATIVE OF THE PHYSICAL NODE ITSELF AND ITS ASSOCIATED
PHYSICAL LINKS AMONG ALL OTHER NODES WITHIN THE SAME PEER GROUP

FIG.16

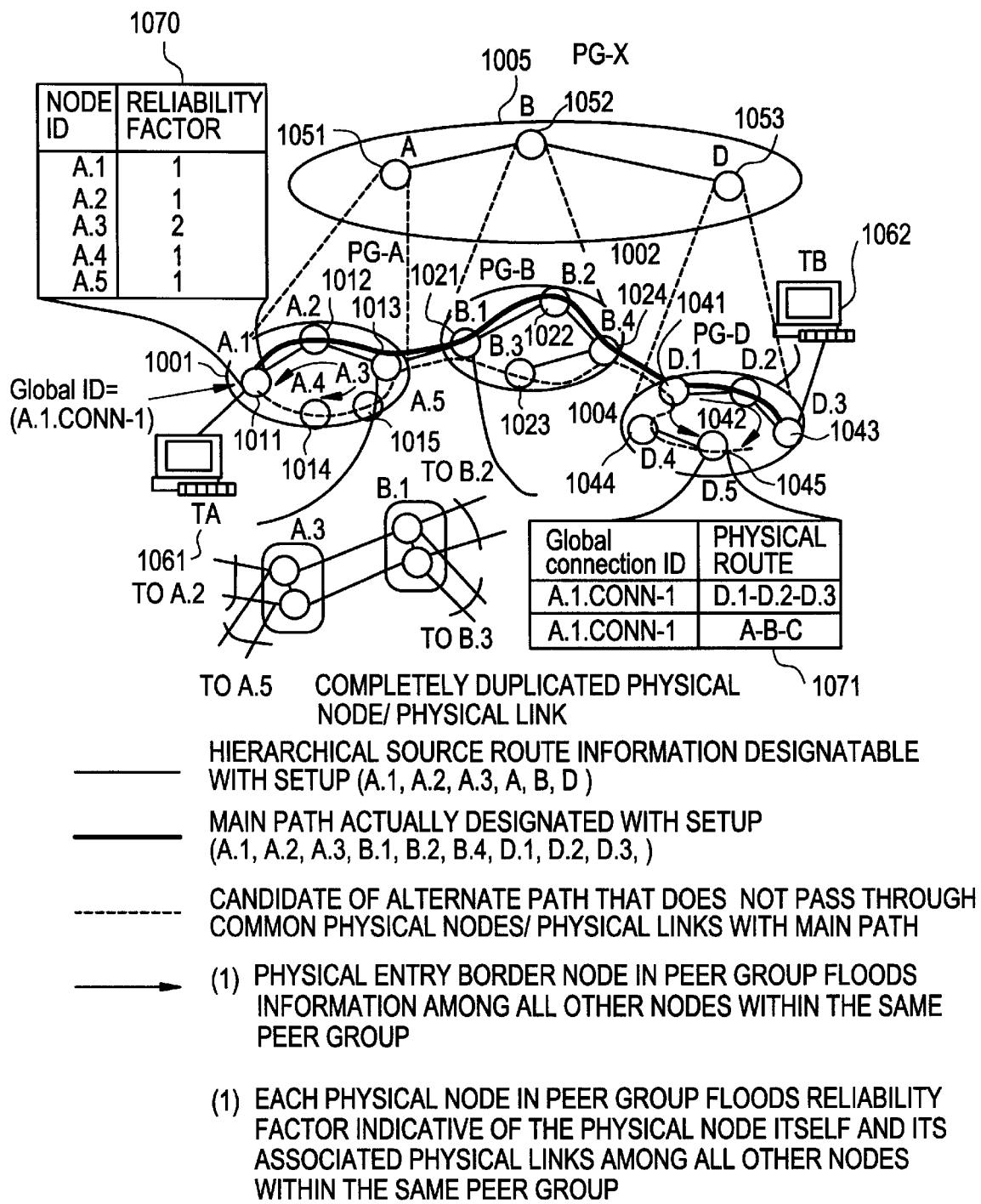

TO A.5   COMPLETELY DUPLICATED PHYSICAL NODE/ PHYSICAL LINK

——————   HIERARCHICAL SOURCE ROUTE INFORMATION DESIGNATABLE WITH SETUP (A.1, A.2, A.3, A, B, D )

██████   MAIN PATH ACTUALLY DESIGNATED WITH SETUP (A.1, A.2, A.3, B.1, B.2, B.4, D.1, D.2, D.3, )

- - - - -  CANDIDATE OF ALTERNATE PATH THAT DOES NOT PASS THROUGH COMMON PHYSICAL NODES/ PHYSICAL LINKS WITH MAIN PATH

———▶   (1) PHYSICAL ENTRY BORDER NODE IN PEER GROUP FLOODS INFORMATION AMONG ALL OTHER NODES WITHIN THE SAME PEER GROUP (1) EACH PHYSICAL NODE IN PEER GROUP FLOODS RELIABILITY FACTOR INDICATIVE OF THE PHYSICAL NODE ITSELF AND ITS ASSOCIATED PHYSICAL LINKS AMONG ALL OTHER NODES WITHIN THE SAME PEER GROUP

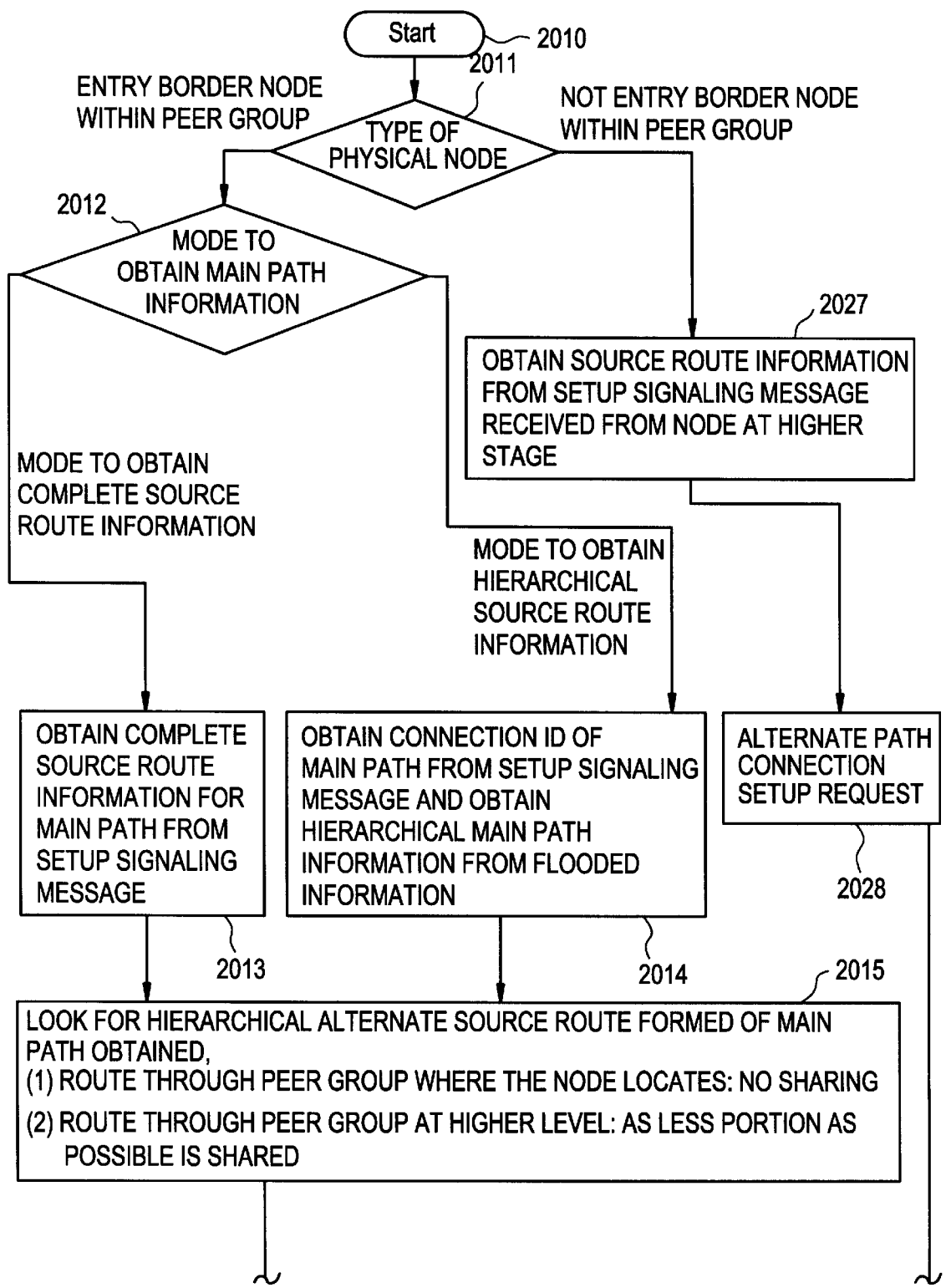

6,026,077

FAILURE RESTORATION SYSTEM SUITABLE FOR A LARGE-SCALE NETWORK

BACKGROUND OF THE INVENTION

The present invention relates to a failure restoration system that performs routing to an alternate path across a network for partially releasing a connection setup in a main path which has encountered a failure by means of previously determining the alternate path. More specifically, the present invention relates to a failure restoration system having a routing function that calls to the destination via an alternate path if there is a failure on the main path, with as few links or nodes on the main path as possible avoided to be used. Failure restoration systems of this type are suitable for large-scale hierarchical networks such as asynchronous transfer mode (ATM) networks.

Failure restoration systems with an alternate path selection unit are well known in the art. Conventional alternate path selection units are either a centralized control type or a flooding type. Centralized control type alternate path selection units have a network management system or systems that discovers topology for an entire network. The alternate path is determined by the centralized control. The network management system in the centralized control type alternate path selection unit queries for link information associated with individual nodes to discover the topology for the entire network. The network management system previously computes routes, i.e., a main path and associated alternate paths for all combinations of nodes based on the topology information.

For the flooding type alternate path selection units, the nodes in the network dynamically and autonomously search the alternate path and set up a connection. Japanese Patent Laid-Open No. 5-114910 discloses an example of a flooding type alternate path selection unit. The alternate path selection unit carries out flooding among nodes In the same network. More specifically, the alternate path selection unit first attempts to find routes to reachable addresses with types of greatest precedence by means of distributing a control message among all nodes in the same network. A node considers a connection through which the control message reaches a destination node as the alternate path.

However, the conventional alternate path selection units have the disadvantage of not being applicable to a large-scale network. Implementing the centralized control type alternate path selection unit in a large-scale network increases a load on the unit for computing the routes. When the flooding type alternate path selection unit is implemented in a large-scale network, the control message for finding a route is distributed among all nodes in the network. Traffic becomes larger over the network for the control packet in proportion to the increase of the network scale. Thus, both the centralized control and the flooding types of alternate path selection units are not suitable for the large-scale network.

SUMMARY OF THE INVENTION

Accordingly, an object of the present invention is to provide a failure restoration system that is capable of selecting an alternate path via different physical nodes/physical links from those in a main path.

Another object of the present invention is to provide a failure restoration system that is capable of selecting an alternate path with all physical nodes/physical links (except for a source node and a destination node) different from those on a main path to restore the connection that has encountered a failure in leaf nodes and/or links with a short delay.

Yet another object of the present invention is to provide a failure restoration system that is capable of selecting an alternate path with all physical nodes/physical links (except for a source node and a destination node) different from those on a main path except for highly reliable (duplicated) physical nodes/physical links to restore the connection that has encountered a failure in leaf nodes and/or links with a short delay.

A failure restoration system according to the present Invention comprises distributed hierarchical routing means capable of exchanging, in a distributed and hierarchical manner, link state parameters between nodes in a connection-oriented network having a plurality of subnetworks, the link state parameters including information about a bandwidth of a link and delay to discover a hierarchical topology, the routing means being adapted to set up a main path and previously determine an alternate path for the main path.

According to a first aspect of the present invention, the failure restoration system comprises alternate path selection means adapted to obtain complete source route information for the main path when it attempts to set up the main path, and add the complete source information to a SETUP signaling message for setting up the alternate path, thereby providing a physical alternate path as much different as possible from the main path.

According to a second aspect of the present invention, the failure restoration system comprises alternate path selection means adapted to flood a combination of hierarchical source route information for the main path assigned for each subnetwork and a unique connection ID for identification of the main path throughout the network, among all nodes other than the flooding source node within the same subnetwork for each subnetwork on the main path when it attempts to set up the main path, the alternate path selection means also being adapted to add the connection ID of the main path to a SETUP signaling message for setting up the alternate path, thereby providing a physical alternate path as much different as possible from the main path.

BRIEF DESCRIPTION OF THE DRAWINGS

FIG. 15 is a chart similar to FIG. 14, which illustrates another flow of the control message;

FIG. 16 is a chart similar to FIG. 14, which illustrates yet another flow of the control message;

DESCRIPTION OF PREFERRED EMBODIMENTS

Figure 1:
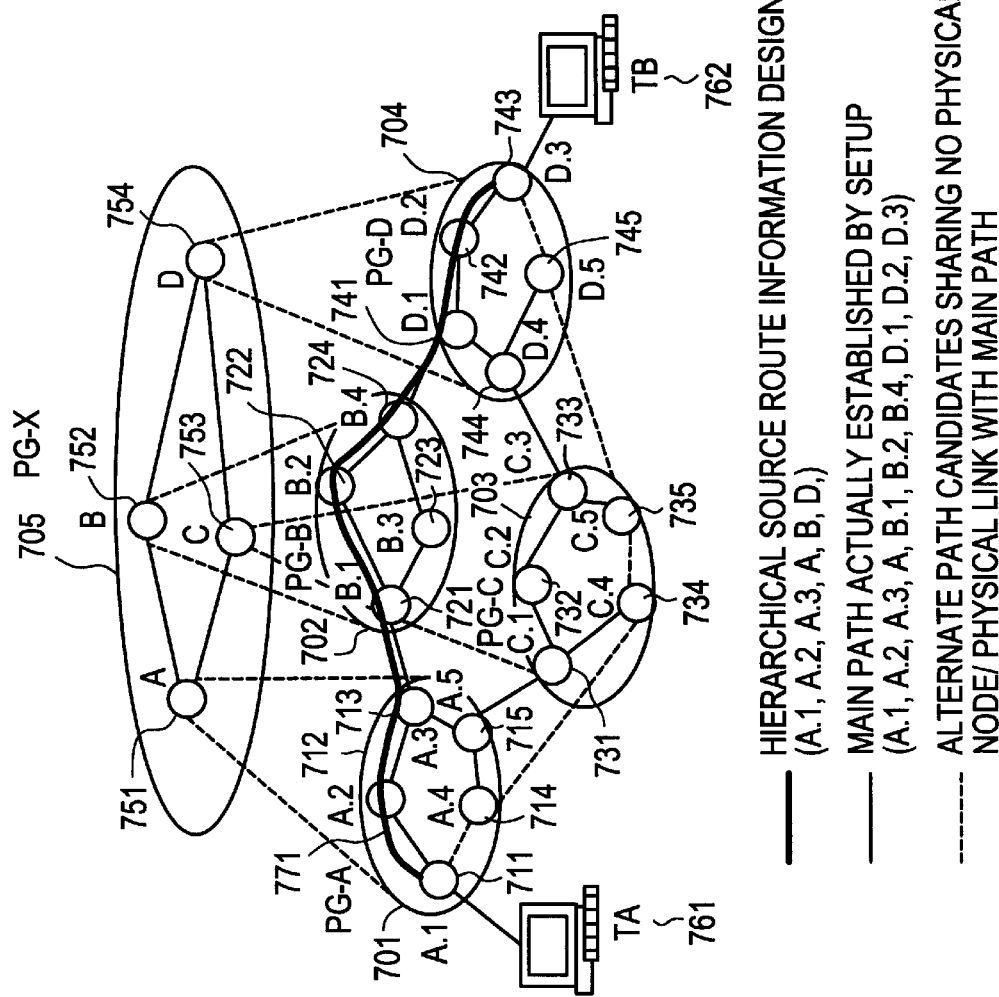
FIG. 1 is a diagram for use in describing routing operation according to a first embodiment of the present invention.

Referring to FIG. 1, an embodiment of the present invention is described to provide a dynamic ATM routing of a larger scale. In FIG. 1, a hierarchical network is provided by using the ATM Forum's Private Network to Network Interface (PNNI) routing protocol First, PNNI routing protocol implementation within a network and an algorithm to exchange topology information are described. PNNI is a Topology State algorithm. It advertises information about the status of links and nodes in the network. The advertised information contains multiple metrics and attributes for links and nodes for each ATM service category. Both topology information and address reachability are advertised. PNNI supports a hierarchical organization of the topology database.

FIG. 1 shows four divergent management subnetworks 701, 702, 703, and 704. Each of the management subnetworks Is formed of five physical ATM nodes (hereinafter, referred to as physical nodes). The management subnetwork is hereinafter referred to as a peer group. For the clarification purpose, the management subnetworks 701 through 704 bear reference symbols PG-A, PG-B, PG-C, and PG-D, respectively. The peer group PG-A is interconnected to the peer group PG-B via a physical link. Likewise, the peer group PG-A is interconnected to the peer group PG-C while the peer groups PG-B and PG-C are interconnected to the peer group PG-D. A peer group PG-X (705) is elected to allow effective exchange of topology information between nodes in the entire physical network. The peer group PG-X (705) is logically at one level higher in the hierarchical network. In the peer group PG-X, the peer groups PG-A through PG-D are considered as separate single nodes of A, B, C, and D (751, 752, 753, and 754), respectively. The topology information is compressed at a hierarchical level. The compressed topology information is exchanged between peer groups in the network. For the logical nodes A through D (751 through 754), either one of the physical nodes corresponding to the respective logical nodes within the peer group at the lowest level or serves to information exchange. For example, the logical node A (751) may be represented by a physical node A.2 (712) and the logical node B (752) may be represented by a physical node B.4 (724).

In such a case, the physical nodes A.1, A.2, A.3, A.4, and A.5 (711, 712, 713, 714, 715) each discovers information of a complete connection topology that indicates physical connections of the physical nodes via the physical links for all physical nodes within the same peer group PG-A (701). The physical nodes A.1 through A.5 (711 through 715) within the peer group PG-A (701) are provided with topology information that allows to see connections among the logical nodes A, B, C, and D in the peer group PG-X (705) at the higher level. In other words, the physical nodes A.1 through A.5 (711 through 715) within the peer group PG-A (701) cannot discover any information about connections among the physical nodes B.1, B.2, B.3, and B.4 (721, 722, 723, and 724) grouped into the peer group PG-B (702).

Next, routing operation is described that place a call between terminals through a main path according to the PNNI routing protocol. As an example, a connection setup of a main path from a terminal TA (761) to a terminal TB (762) is described in terms of computation of the main path and signaling. The terminal TA (761) is connected to the physical node A.1 (711) while the terminal TB (762) is connected to the physical node D.3 (743).

The source terminal TA (761) connected to the physical node A.1 (711) designates an address of the destination terminal TB (762) to transmit a SETUP signaling message. In such a case, the physical node, i.e., an entry border node, A.1 (711) within the peer group PG-A (701) computes a route within the peer group PG-A (701). The entry border node A.1 (711) receives a call and this is the first node within the peer group PG-A (701) to see this call. The physical node A.1 (711) is provided with information about a route outside the peer group PG-A (701). More specifically, the physical node A.1 (711) designates a route according to rough topology information for the peer group PG-X (705) at the higher level or hieralchy. Then it discovers route information of [A.1, A.2, A.3][A, B, C] as hierarchical source route information. The physical node A.1 (711) designates the route to transfer the SETUP signaling message to a physical node in an adjacent neighbor stage.

Subsequently, the physical nodes A.2 (712) and A.3 (713) merely look up the route information of [A.1, A.2, A.3][A, B, C] to transfer the SETUP signaling message. The SETUP signaling message is transmitted to the adjacent neighbor peer group PG-B (702) via the physical nodes A.1, A.2, and A.3 (711, 712, and 713). Next, the physical node B.1 (721) or the entry border node of the peer group PG-B (702) computes which physical nodes within the peer group PG-B (702) should be interconnected to each other to reach from the peer group PG-B (702) to the peer group PG-D (704). As a result, the physical node B.1 (721) can discover route information of [B.1, B.2, B.3][A, B, D]. Repeated cycles of the above-mentioned operation provide a main path 711 with [A.1, A.2, A.3][B.1, B.2, B.3][D.1, D.2, D.3]. A thick solid line in FIG. 1 depicts the main path.

Figure 2:
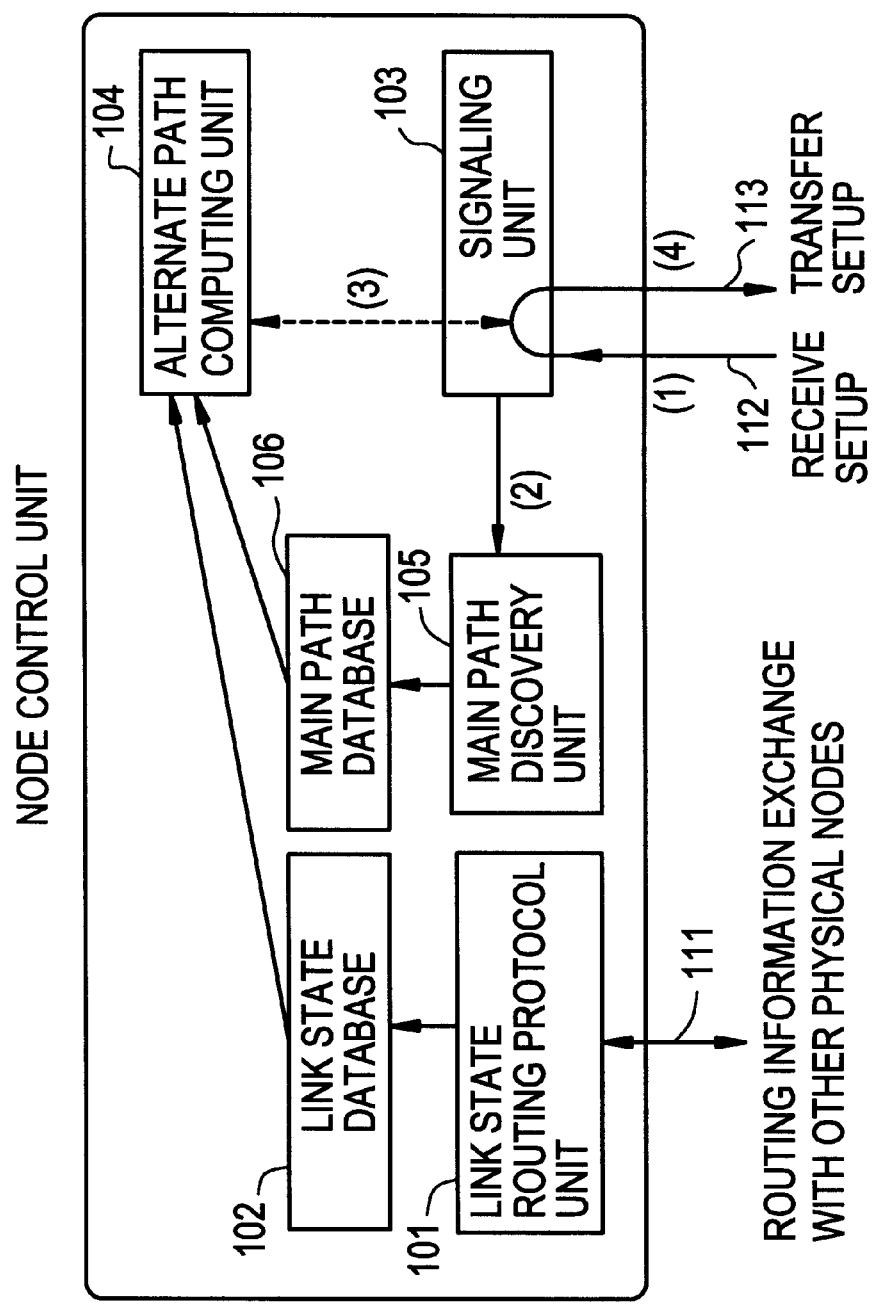
FIG. 2 is a block diagram showing a configuration of a node control unit that is an essential part of a failure restoration system according to the first embodiment of the present invention.

FIG. 2 shows a configuration of a node control unit in a peer group, that is an essential part of the failure restoration system according to a first embodiment of the present invention. The node control unit comprises six components, i.e., a link state routing protocol unit 101, a link state database 102, a signaling unit 103, an alternate path computing unit 104, a main path discovery unit 105, and a main path database 106. Which components of the six are used depends on the location of the physical node within each peer group. The physical nodes on one route may be either a physical entry border node in a peer group or other physical nodes. The physical entry border node uses all of the six components. Other physical nodes use the signaling unit alone.

First, operation of the node control unit in the physical entry border node is described. Operation for the remaining nodes follows.

The link state routing protocol unit 101 is essential protocol means for the conventional PNNI routing protocol. The link state routing protocol unit 101 exchanges hello messages with neighboring physical nodes. The link state routing protocol unit 101 thus determines whether a given link is acceptable and/or desirable for carrying a given connection between the physical node where it locates and the adjacent neighbor physical nodes. A notification is flooded throughout the same peer group. The notification contains appropriate information about a bandwidth and delay in the physical link between the adjacent physical nodes. As a result of the flooding, all the physical nodes within the same peer group note the connection topology information for all physical nodes. Likewise, the node which has been elected to perform some of the functions associated with a logical node at a higher level in the same peer group exchanges the hello message with the adjacent neighbor logical node within the peer group PG-X at a higher level or hierarchy. The elected node floods or disseminates the link state parameters for discovered adjacent neighbor topology information and a lower level or hierarchy in a compressed format. The elected node disseminates such information to the logical nodes within the peer group PG-X at the higher level. This allows the logical nodes within the peer group PG-X at the higher level to discover the connection topology information for all logical nodes. The connection topology information is flooded among all logical nodes within the peer groups at the lower level. The above-mentioned operation is repeated recursively for all levels of the hierarchy to exchange the hierarchical link state parameters. The link state parameters captured by the link state routing protocol unit 101 in the manner described above are stored in the link state database 102.

The signaling unit 103 processes a SETUP signaling message for use in selecting the main path. The signaling unit 103 in the physical entry border node (i.e., the physical node to which a terminal is directly connected) within the peer group at the first stage obtains complete source route information indicating an end-to-end establishment procedure for the main path. The signaling unit 103 notifies the main path discovery unit 105 of the complete source route information obtained. The complete source route information is stored in the main path database 106. At the same time, the signaling unit 103 requests the alternate path computing unit 104 for computing an alternate path that does not join up with the main path. In response to the computing request, the alternate path computing unit 104 computes the alternate path that does not join up with the main path. The alternate path computing unit 104 computes the route in a hierarchical source route format in accordance with the link state parameters stored in the link state database 102 and the complete source route information stored in the main path database 106. The alternate path computing unit 104 then informs the signaling unit 103 of the alternate path obtained by the computation. In response to this, the signaling unit 103 designates the alternate path to transfer the SETUP signaling message to the physical node at the adjacent neighbor stage. At that time, the SETUP signaling message is added with information indicative of the type of the route, i.e., whether it is the main path or the alternate path. For the alternate path, the SETUP signaling message is also added with the complete source route information indicating the end-to-end establishment procedure for the main path.

When the physical node at the adjacent neighbor stage is not a physical entry border node of the peer group, the signaling unit 103 at that stage transfers the SETUP signaling message to its adjacent neighbor physical node. In this event, the signaling unit 103 transfers the message according to the hierarchical source route information for the alternate path that is contained in the SETUP signaling message.

For the physical entry border node within the peer group (s) on the trunk route, the main path discovery unit 105 obtains the complete source route information indicating the end-to-end establishment procedure for the main path when the signaling unit 103 discovers that the received message is the SETUP signaling message for the alternate path. The main path discovery unit 105 then stores the source route information in the main path database 106. The signaling unit 103 obtains the hierarchical source route information for the alternate path from the SETUP signaling message. The signaling unit 103 looks for detailed alternate path information that complements the hierarchical source route information of the alternate path. To this end, the signaling unit 103 notifies the alternate path computing unit 104 of the hierarchical source route information for the alternate path. The alternate path computing unit 104 computes the alternate path that does not join up with the main path. The unit 104 computes the route in accordance with the link state parameters stored in the link state database 102 and the source route information stored in the main path database 106. The alternate path computing unit 104 then notifies the signaling unit 103 of the alternate path obtained by the computation. In response to this, the signaling unit 103 designates the alternate path to transfer the SETUP signaling message to the physical node at the adjacent neighbor stage.

Figure 3:
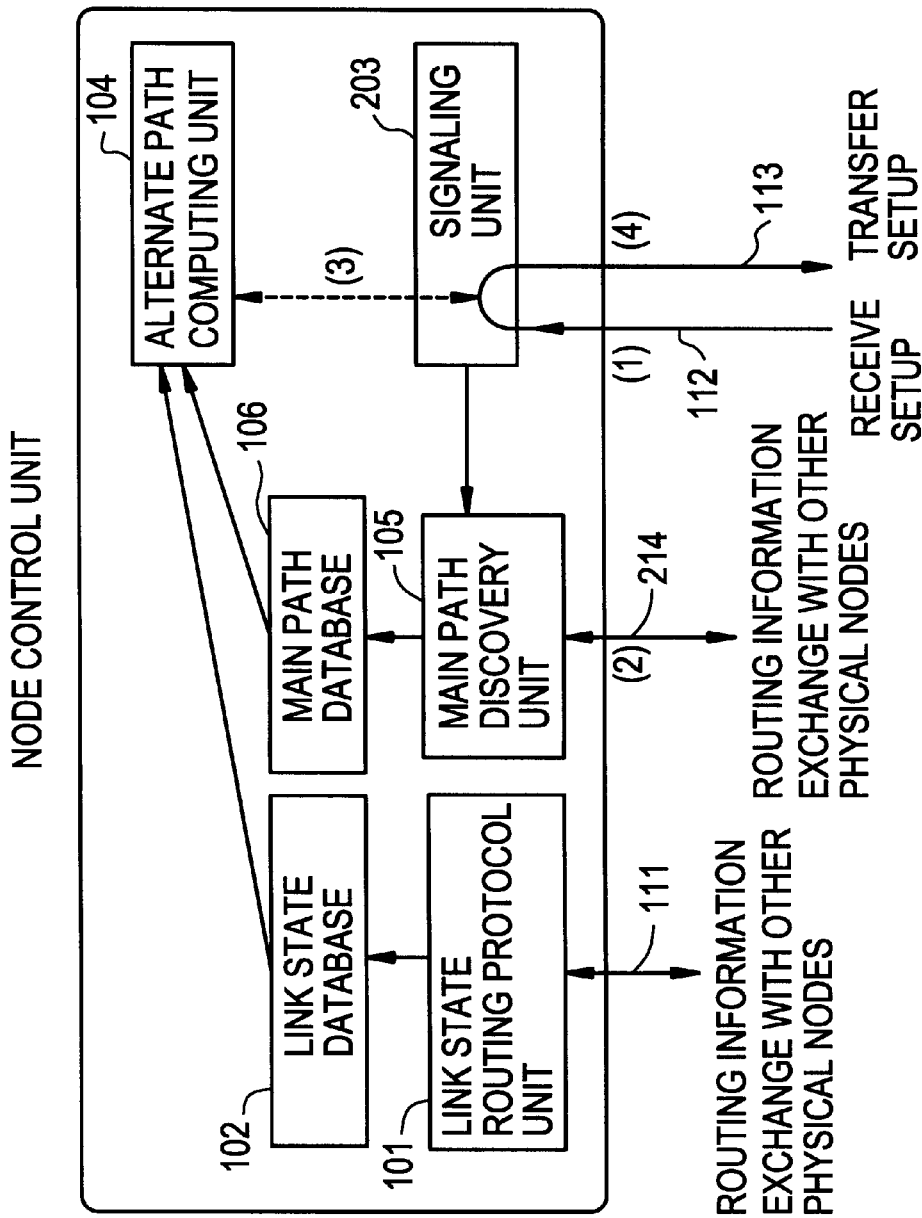
FIG. 3 is a block diagram showing a configuration of a node control unit that is an essential part of a failure restoration system according to a second embodiment of the present invention.

FIG. 3 shows a configuration of a node control unit in a peer group, that is an essential part of the failure restoration system according to a second embodiment of the present invention. The node control unit is same as the node control unit illustrated in FIG. 1 except for a signal line 214 for the main path information and functions of a signaling unit 203. Described are a physical entry border node within the peer group at the first stage, the physical node as a trunk node, and the physical entry border node within the peer group on the trunk route.

All peer groups have a physical entry border node with a signaling unit 203. Each signaling unit 203 floods a connection ID of the main path and associated hierarchical main path information among the physical nodes within the same peer group. The connection ID and the route information are flooded via a signal line 214 by the main path discovery unit 105. The main path discovery unit 105 in each physical node within the same peer group receives the flooded information and stores it in the main path database 106.

After the flooding, the signaling unit 203 in the physical entry border node within the peer group at the first stage requests, with the connection ID of the main path, the alternate path computing unit 104 for computing an alternate path that does not join up with the hierarchical main path determined. In response to the computing request, the alternate path computing unit 204 computes the alternate path that does not join up with the main path. The unit 104 computes the route in a hierarchical source route format in accordance with the link state parameters stored in the link state database 102 and the source route information stored in the main path database 106. The alternate path computing unit 104 then informs the signaling unit 203 of the alternate path obtained by the computation. In response to this, the signaling unit 203 designates the alternate path to transfer the SETUP signaling message to the physical node at the adjacent neighbor stage. At that time, the SETUP signaling message is added with information Indicative of the type of the route, i.e., whether it is the main path or the alternate path, of which connection setup is in progress. For the alternate path, the SETUP signaling message is also added with the connection ID of the main path. The main path can be uniquely discovered throughout the network with this connection ID.

When the physical node at the adjacent neighbor stage is not a physical entry border node of the peer group, the signaling unit 203 at that stage transfers the SETUP signaling message to its adjacent neighbor physical node. In this event, the signaling unit 203 transfers the message according to the hierarchical source route information for the alternate path that is contained in the SETUP signaling message.

For the physical entry border node within the peer group on the trunk route, the signaling unit 203 requests, with the connection ID of the main path, the alternate path computing unit 104 for computing the alternate path that does not join up with the hierarchical main path. This is made when the signaling unit 203 discovers that the received message is the SETUP signaling message for the alternate path. The signaling unit 203 obtains the hierarchical source route information for the alternate path from the SETUP signaling message. The signaling unit 203 looks for detailed alternate path information that complements the hierarchical source route information of the alternate path. To this end, the signaling unit 203 notifies the alternate path computing unit 104 of the hierarchical source route information for the alternate path. The alternate path computing unit 104 computes the alternate path that does not join up with the main path. The unit 104 computes the route in accordance with the link state parameters stored in the link state database 102 and the source route information stored in the main path database 106. The alternate path computing unit 104 then informs the signaling unit 203 of the alternate path obtained by the computation. In response to this, the signaling unit 203 designates the alternate path to transfer the SETUP signaling message to the physical node at the adjacent neighbor stage.

Figure 4:
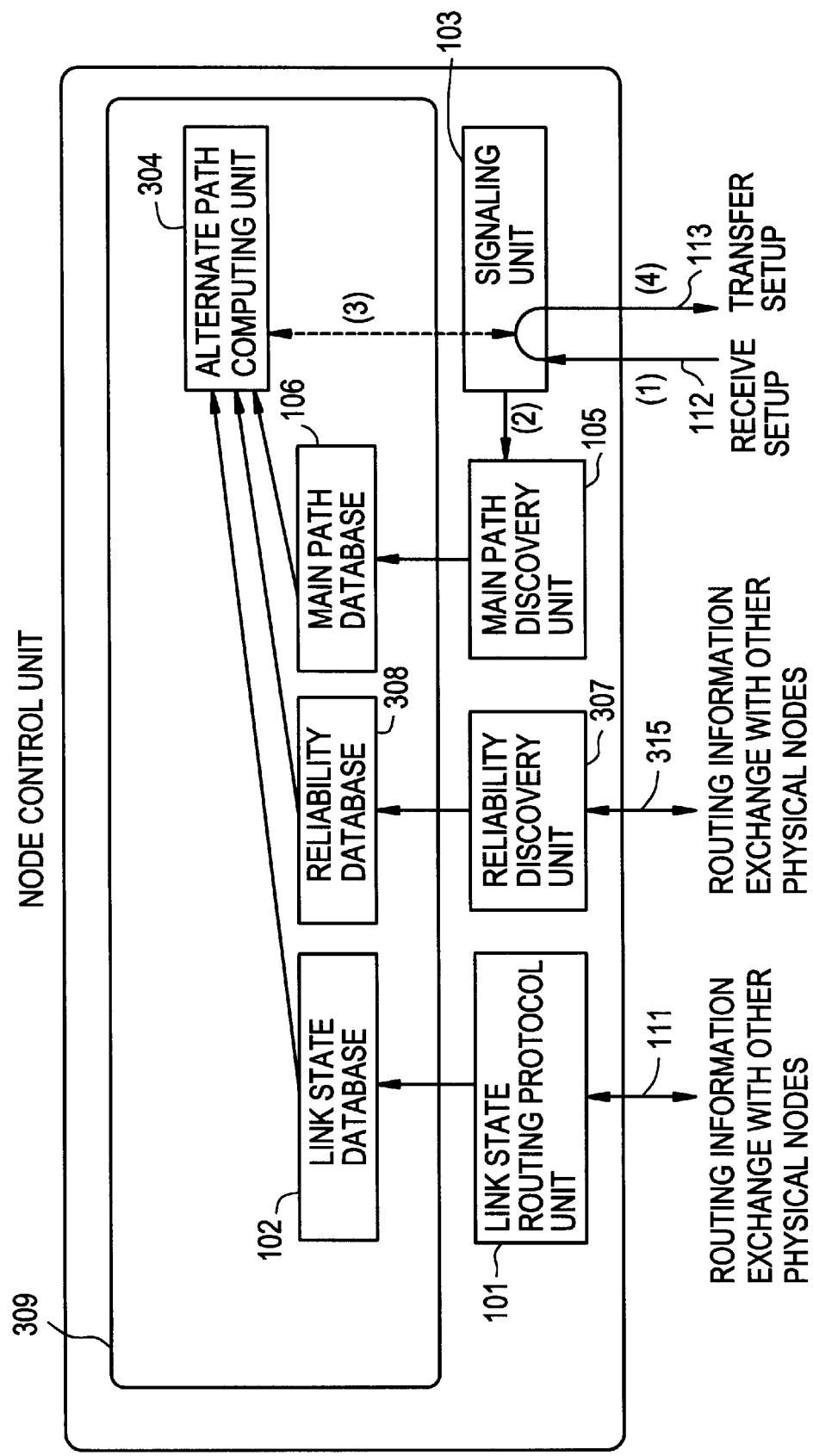
FIG. 4 is a block diagram showing a configuration of a node control unit that is an essential part of a failure restoration system according to a third embodiment of the present invention.

FIG. 4 shows a configuration of a node control unit in a peer group, that is an essential part of the failure restoration system according to a third embodiment of the present invention. The node control unit is same as the node control unit illustrated in FIG. 2 except for a reliability discovery unit 307, a reliability database 308, and an alternate path computing unit 304. The reliability discovery unit 307 is for discovering a reliability of physical nodes/physical links and the reliability database 308 is for the reliability discovery unit 307. Reliability information indicates the reliability of the physical nodes/physical links. More specifically, the reliability information is represented by a reliability factor indicating, for example, whether the nodes/links are duplicated. Only the different components from FIG. 2 are described below especially for the physical entry border node within a peer group.

The reliability discovery unit 307 floods or advertises reliability information among the physical nodes via a signal line 315. The flooding is made depending on the degree of reliability expected from the physical node where the reliability discovery unit 307 locates and from the physical links associated with that node. The reliability discovery units 307 in the respective physical nodes discover the reliability of the peripheral physical nodes/physical links. The reliability discovery unit 307 then stores the reliability information in the associated reliability database 308.

The signaling unit 103 requests the alternate path computing unit 304 for computing the alternate path that does not join up with the main path. In response to the computing request, the alternate path computing unit 304 selects the alternate path. More specifically, the alternate path computing unit 304 permits only a highly reliable physical node/physical link to be shared between the main and the alternate paths. The remaining portion of the alternate path is determined such that it does not join up with the main path. This computation by the unit 304 is performed in accordance with the link state parameters stored in the link state database 302, the reliability information in the reliability database 308, and the source route information stored in the main path database 306.

The alternate path computing unit 304 then informs the signaling unit 103 of the alternate path obtained by the computation. In response to this, the signaling unit 103 designates the alternate path to transfer the SETUP signaling message to the physical node at the adjacent neighbor stage.

Figure 5:
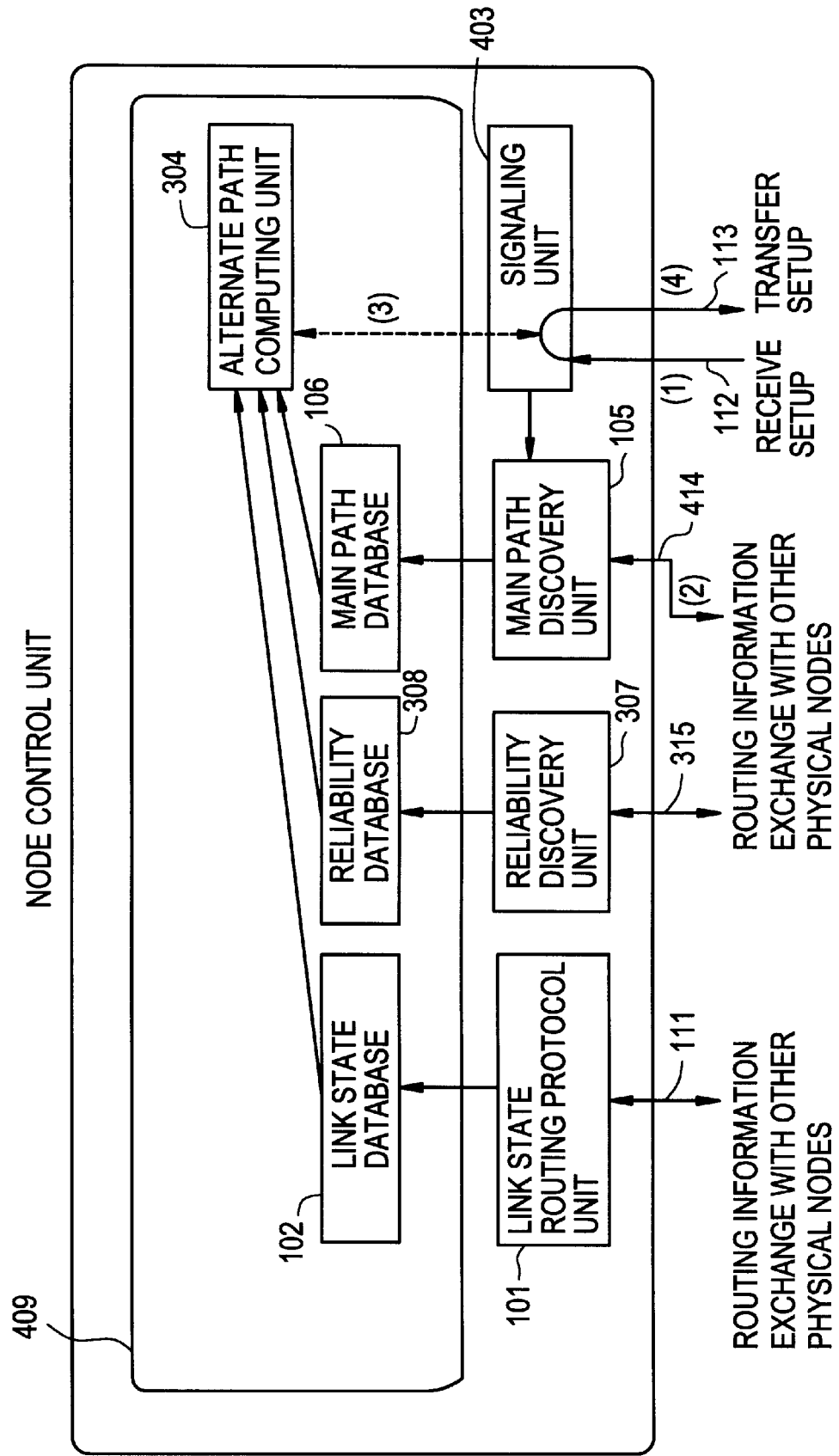
FIG. 5 is a block diagram showing a configuration of a node control unit that is an essential part of a failure restoration system according to a fourth embodiment of the present invention.

FIG. 5 shows a configuration of a node control unit in a peer group, that is an essential part of the failure restoration system according to a fourth embodiment of the present invention. The node control unit is same as the node control unit illustrated in FIG. 4 except for a signal line 414 for the main path information and functions of a signaling unit 403. Only the different components from FIG. 4 are described below in view of functions thereof.

In FIG. 5, the main path discovery unit 105 exchanges the hierarchical source route information with other physical nodes by means of flooding via the signal line 414. The signaling unit 403 requests the alternate path computing unit 304 for computing the alternate path with the designation of the main path by the connection ID.

Figure 6:
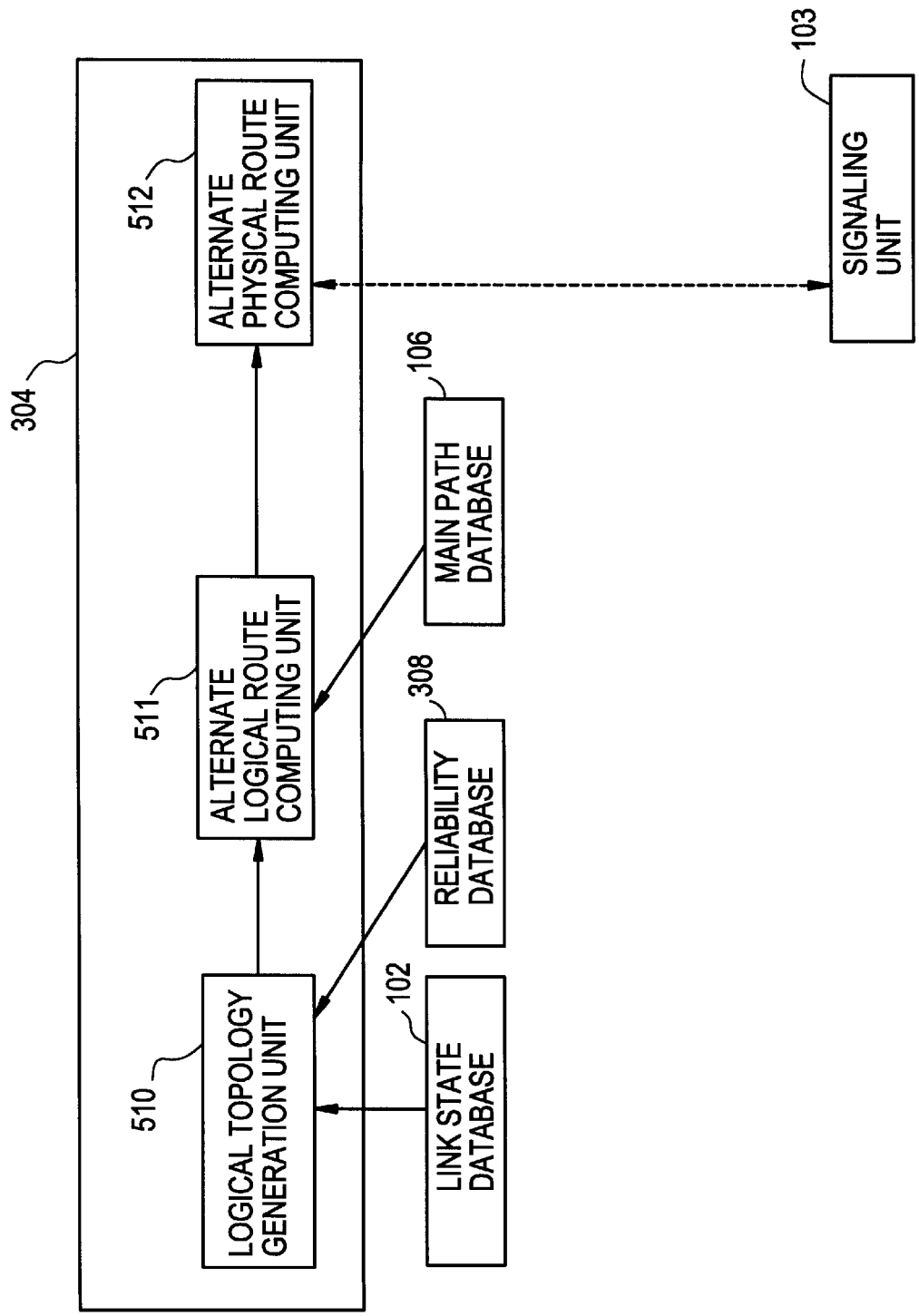
FIG. 6 is a block diagram showing a configuration of an alternate path computing unit and peripheries thereof illustrated in FIGS. 4 and 5.

FIG. 6 shows a configuration of a node control unit in the failure restoration system according to a fifth embodiment of the present invention. The node control unit corresponds to the inside of the block 309 in FIG. 4 or the block 409 in FIG. 5. The alternate path computing unit 304 is illustrated particularly in detail. The alternate path computing unit 304 comprises a logical topology generation unit 510, a logical alternate path computing unit 511, and a physical alternate path computing unit 512.

Upon request from the signaling unit 103, the alternate path computing unit 304 computes the alternate path that does not join up with the main path At that time, the logical topology generation unit 510 logically classifies the highly reliable physical nodes/physical links into two nodes/links. This classification is made according to the link state parameters in the link state database 102 and the reliability information stored in the reliability database 308. The logical topology generation unit 510 derives a logical topology with all nodes/links having similar or equivalent reliability. The logical alternate path computing unit 511 computes a logical alternate path that does not join up with the main path on the above logical topology. The computation is made in accordance with the derived logical topology and the source route information in the main path database 308. The physical alternate path computing unit 512 computes the alternate path by means of degenerating the information on the logical alternate path obtained by the logical alternate path computing unit 511 into information on the physical alternate path. The physical alternate path computing unit 152 notifies the signaling unit 103 of the alternate path determined according to the computation result.

Figure 7:
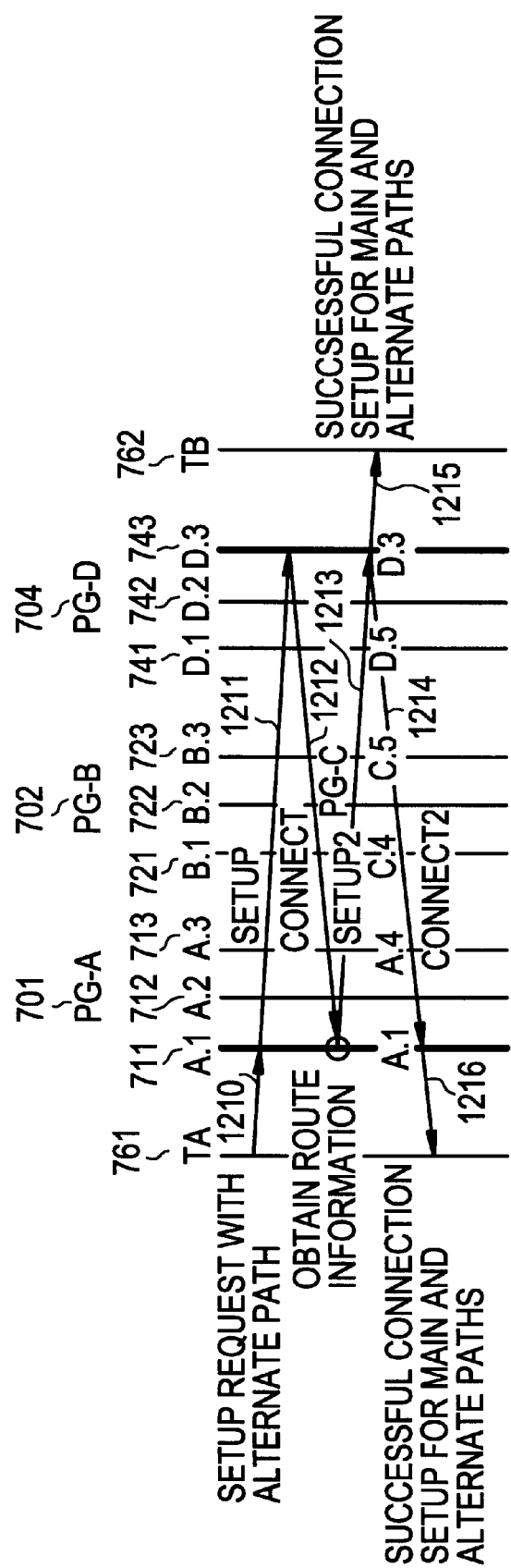
FIG. 7 is a chart for use in describing a flow of a control message during the routing operation described in conjunction with FIG. 1.

Referring to FIG. 7 in addition to FIG. 1, routing operation according to the first embodiment of the invention is described. FIG. 7 illustrates a flow of a signaling message for setting up a connection for the respective peer groups, the physical nodes, and the terminals in FIG. 1. In this example, the SETUP signaling message is extended and is added with the complete source route information for the main path between the source terminal and the destination terminal. In this way, the alternate path is given that does not join up with the main path.

FIG. 7 corresponds to a case where the terminal TA (761) issues a connection setup request (operation 1210) with the alternate path to set up the connection to the terminal TB (762). As apparent from FIG. 1, the physical node A.1 (711) at the first stage determines the route to the destination terminal TB (762) as [A.1, A.2, A.3][A, B, D]. The physical node A.1 (711) transfers the SETUP signaling message among all other physical nodes within the peer group PG-A in the order of A.1, A.2, and A.3. The physical node A.3 (713) finds that it is the physical exit border node within the peer group PG-A. Thus the physical node A.3 (713) transfers the SETUP signaling message to the peer group PG-B according to the route information of [A, B, D]. The physical node A.3 (713) transfers the SETUP signaling message to the physical node B.1 (721) with the addition of route information of [A, B, D]. The physical node B.1 (721) refers to the route information of [A, B, D] and searches for the physical exit border node for the peer group PG-D (704). The physical node B.1 (721) thus finds that the physical exit border node is the node B.4 (724). Then, the physical node B.1 (721) computes a route within the peer group PG-B to reach the physical node B.4 (724). The physical node B.1 (721) complements the route information. As a result, the physical node B.1 (721) obtains the route information as [B.1, B.2, B.4][A, B, D]. The physical node B.1 (721) transfers the SETUP signaling message among all other physical nodes within the peer group PG-B in the order of B.1, B.2, and B.4. Likewise, the SETUP signaling message is transferred in the order of D.1, D.2, and D.3. This sets up the connection from the terminal TA (761) to the terminal TB (762). The physical exit border node D.3 (743) at the last stage on the main path, to which the destination terminal TB (762) is connected, sends a response to the physical node A.1 (711). More specifically, the physical exit border node D.3 (743) supplies a CONNECT message indicative of success of setting of the connection and the end-to-end complete source route information. The physical node A.1 (711) maintains the complete source route information. In this example, the complete source route information is [A.1, A.2, A.3][B.1, B.2, B.4][D.1, D.2, D.3].

Subsequently, this complete source route information is used to find the alternate path that does not share the physical nodes/physical links with the main path. The physical entry border node A.1 (711) at the first stage to which the terminal TA (761) is connected directly looks for hierarchical candidates of the alternate path. In this event, the node A.1 (711) uses both the hierarchical PNNI topology information therein and the complete source route information of [A.1, A.2, A.3][B.1, B.2, B.4][D.1, D.2, D.3] obtained in the manner described above In the peer group PG-X (705) in FIG. 1, the main path 711 is [A, B, D] The alternate path that does not join up with the main path 771 is [A, C, D]. Likewise, the physical node A.1 (711) looks for a route from the peer group PG-A (701) to the peer group PG-C (703) as the alternate path that does not join up with the main path of [A.1, A.2, A.3] through the peer group PG-A (701). As a result, the physical node A.1 (711) can use, for example, the alternate path of [A.1, A.4]. The above-mentioned procedure provides the hierarchical alternate path of [A.1, A.4][A, C, D].

Then, the physical node A.1 (711) sets up the connection (operation 1213) with the addition of the complete source route information for the main path, [A.1, A.2 A.3][B.1, B.2, B.4][D.1, D.2, D.3], along with the hierarchical information for the alternate path, [A.1, A.4][A, C, D], to the SETUP signaling message.

The main path does not pass through the peer group PG-C (703) on the trunk route. Accordingly, no problems are in the computation of a route through the peer group PG-C (703) to the peer group PG-D (704). However, it is necessary to find the alternate path that does not join up with the route through the peer group PG-D (704) from the physical entry border node D.1 (741) to the physical exit border node D.3 (743) to which the destination terminal TB (762) is connected. Therefore, it is necessary to find a route from another physical entry border node, D.5 (745) to the physical node D.3 (743) through the peer group PG-D (704). The physical node D.5 (745) refers the SETUP signaling message and discovers the complete source route information for the main path, [A.1 A.2, A.3][B.1, B.2, B.4][D.1, D.2, D.3]. The physical node D.5 (745) then computes the alternate path that does not pass through the physical link between the physical nodes D.1 (741) and D.2 (742) and the physical link between the physical nodes D.2 (742) and the D.3 (743). As a result, the physical node D.5 (745) selects the route of [D.5, D.3] as the alternate path that does not join up with the main path, rather than the route of [D.5, D.4, D.1, D.2, D.3]. In this manner, the signaling allows to establish the alternate path that does not join up with the main path.

The physical node D.3 (743) supplies the SETUP signaling message to the destination terminal TB (762) when the SETUP signaling message reaches the physical node D.3 (743) in the destination. The physical node D.3 (743) thus notifies the destination terminal TB (762) of successful connection setup of both the main and the alternate paths (operation 1215). At the same time, the physical node D.3 (743) sends the CONNECT message to the physical node A.1 (711) (operation 1214). In response to the reception of the CONNECT message, the physical node A.1 (711) notifies the terminal TA (761) of the establishment of both the main and the alternate paths (operation 1216). The above-mentioned procedure sets up the main path and the alternate path that does not join up with the alternate path.

In FIG. 7, the terminal TA (761) and the terminal TB (762) are notified of the establishment of the routes at the time of successful connection setup for the both. However, the notification may be made separately. An example of such operation is described below with reference to FIG. 8.

Figure 8:
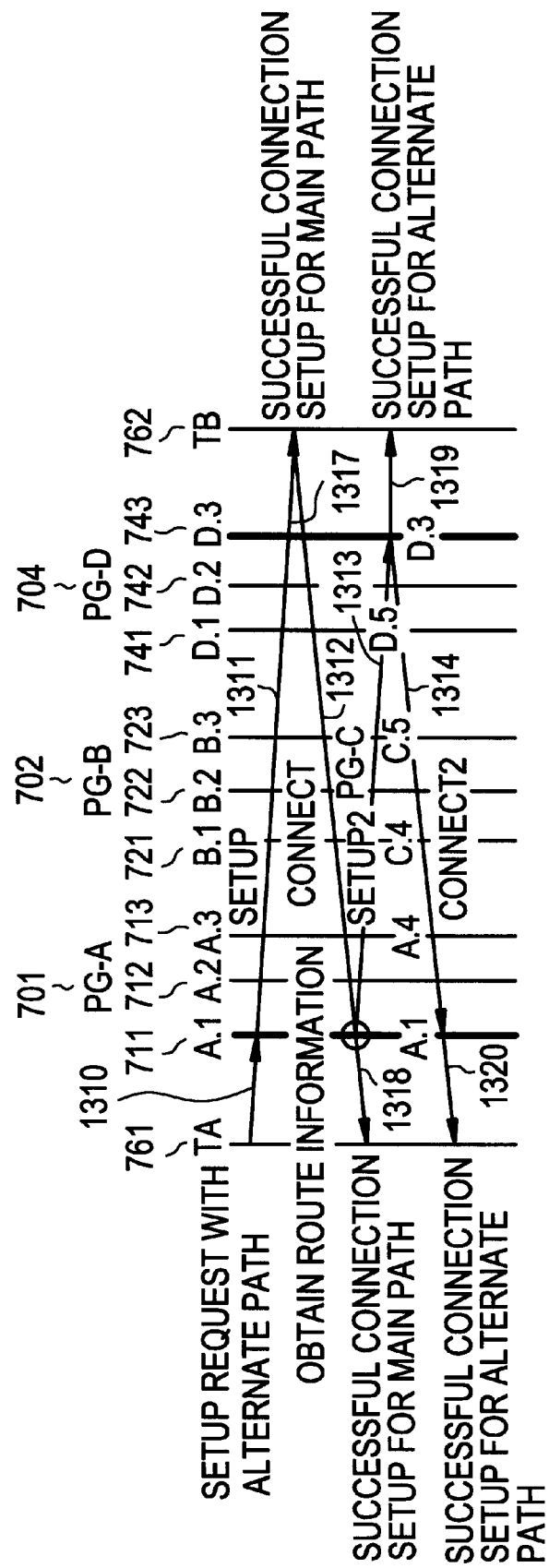
FIG. 8 is a chart similar to FIG. 7, which illustrates another flow of the control message.

In FIG. 8, the terminal TA (761) and the terminal TB (762) are notified that the main path has been established (operations 1317 and 1318) at the timing of successful connection setup (operations 1311 and 1312). On the other hand, the terminal TA (761) and the terminal TB (762) are notified that the alternate path has been established (operations 1319 and 1320) at the timing of successful connection setup (operations 1313 and 1314). In this embodiment, the terminal TA (761) can communicate with the peer groups, provided that switching, upon failure on the main path, to an alternate path takes a longer time after the connection has set up for the main path but not for the alternative path. This modification is advantageous for applications that are strict to a delay of connection setup.

Figure 9:
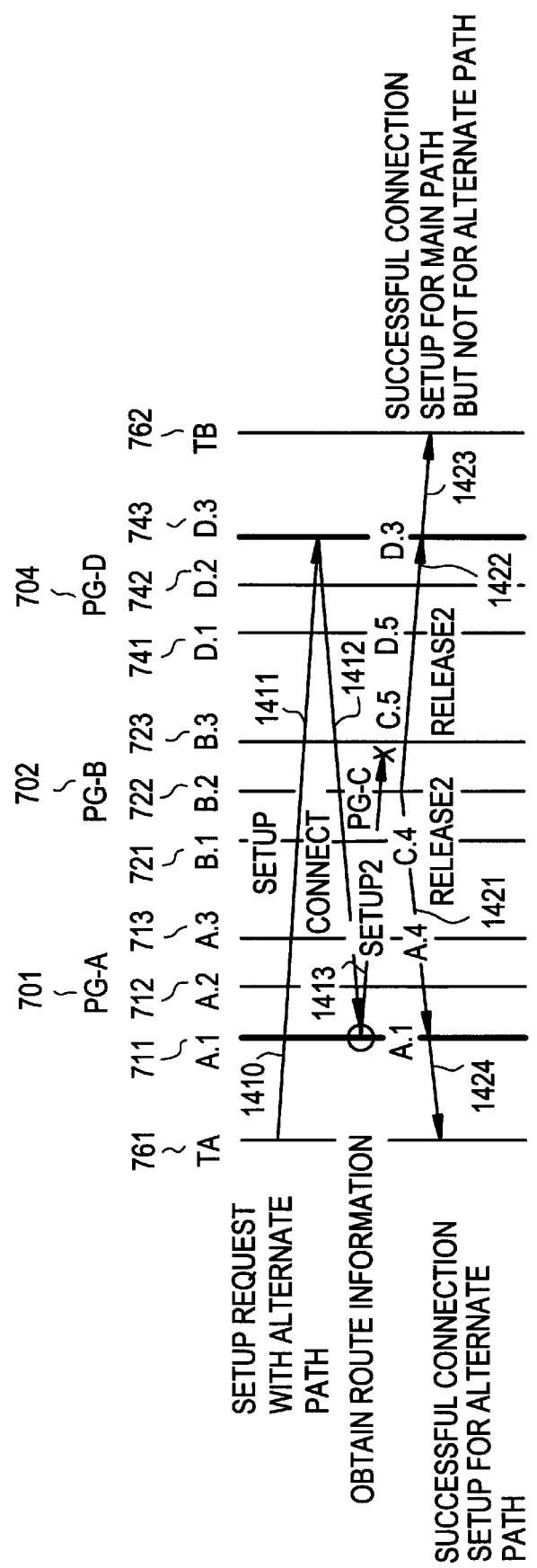
FIG. 9 is a chart similar to FIG. 7, which illustrates a flow of the control message when a connection setup in progress has encountered a failure.
Figure 10:
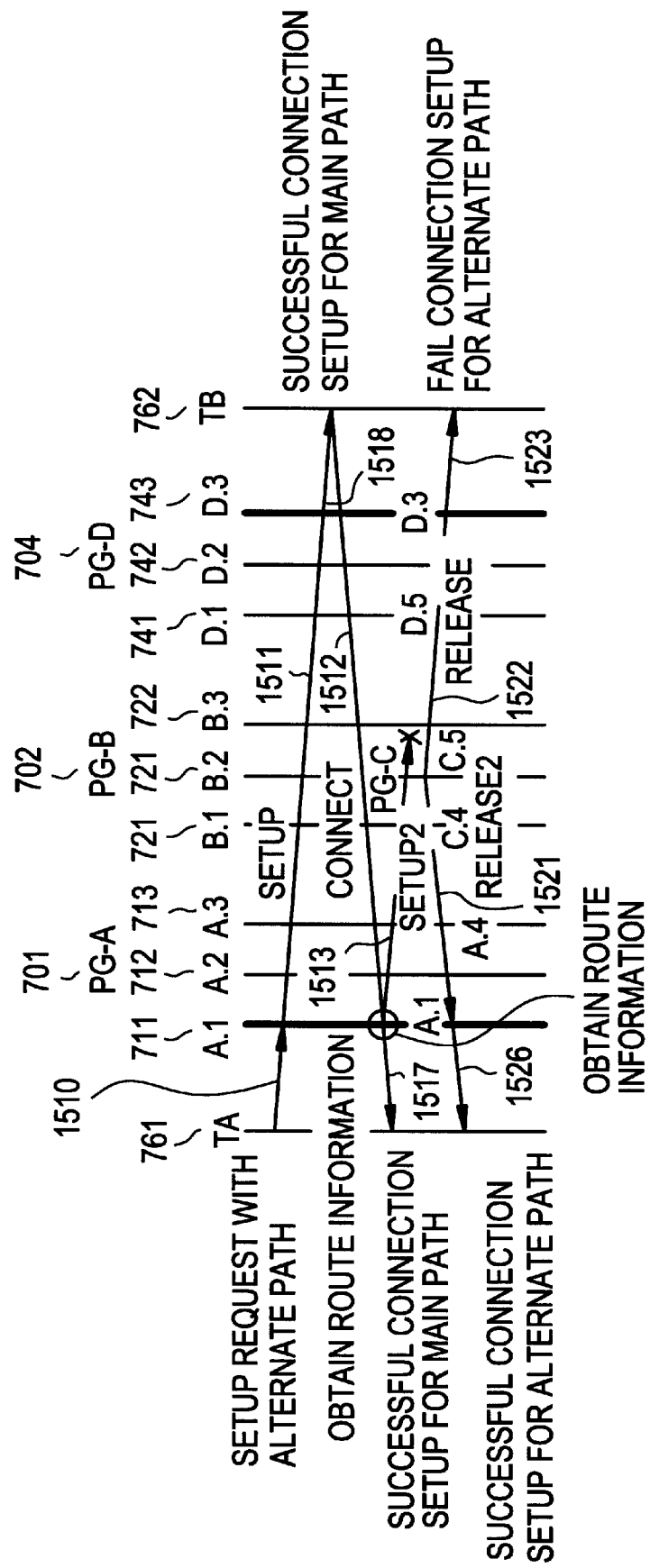
FIG. 10 is a chart similar to FIG. 9, which illustrates another flow of the control message when a connection setup in progress has encountered a failure.

Referring to FIGS. 9 and 10, description is made in conjunction with a case where the main path has established successfully but not the alternate path. FIG. 9 illustrates a case where a failure is detected within the peer group PG-B (702) on the trunk route when the physical node A.1 (711) attempts to set up the connection for the alternate path. In this event, the peer group PG-B (702) supplies a connection release message (RELEASE message) to the physical node A.1 (711) on the source side and the physical node D.3 (743) on the destination side (operations 1421 and 1422). At that time, the physical node A.1 (711) and the physical node D.3 (743) notify the terminal TA (761) and the terminal TB (762), respectively, of the successful connection setup for the main path but not for the alternate path (operations 1423 and 1424).

In FIG. 10, the successful connection setup for the main path is indicated to the terminal TA (761) and the terminal TB (762) at operations 1517 and 1518. It is assumed that a failure is detected within the peer group PG-B (702) on the trunk route when the physical node A.1 (711) attempts to set up the connection for the alternate path (operation 1513). In such a case, the peer group PG-B (702) supplies the RELEASE message to the physical node A.1 (711) and the physical node D.3 (743) (operations 1521 and 1522). In response to this, the physical node A.1 (711) and the physical node D.3 (743) notify the terminal TA (761) and the terminal TB (762), respectively, of unsuccessful setup of a connection for the alternate path (operations 1526 and 1527).

Figure 11:
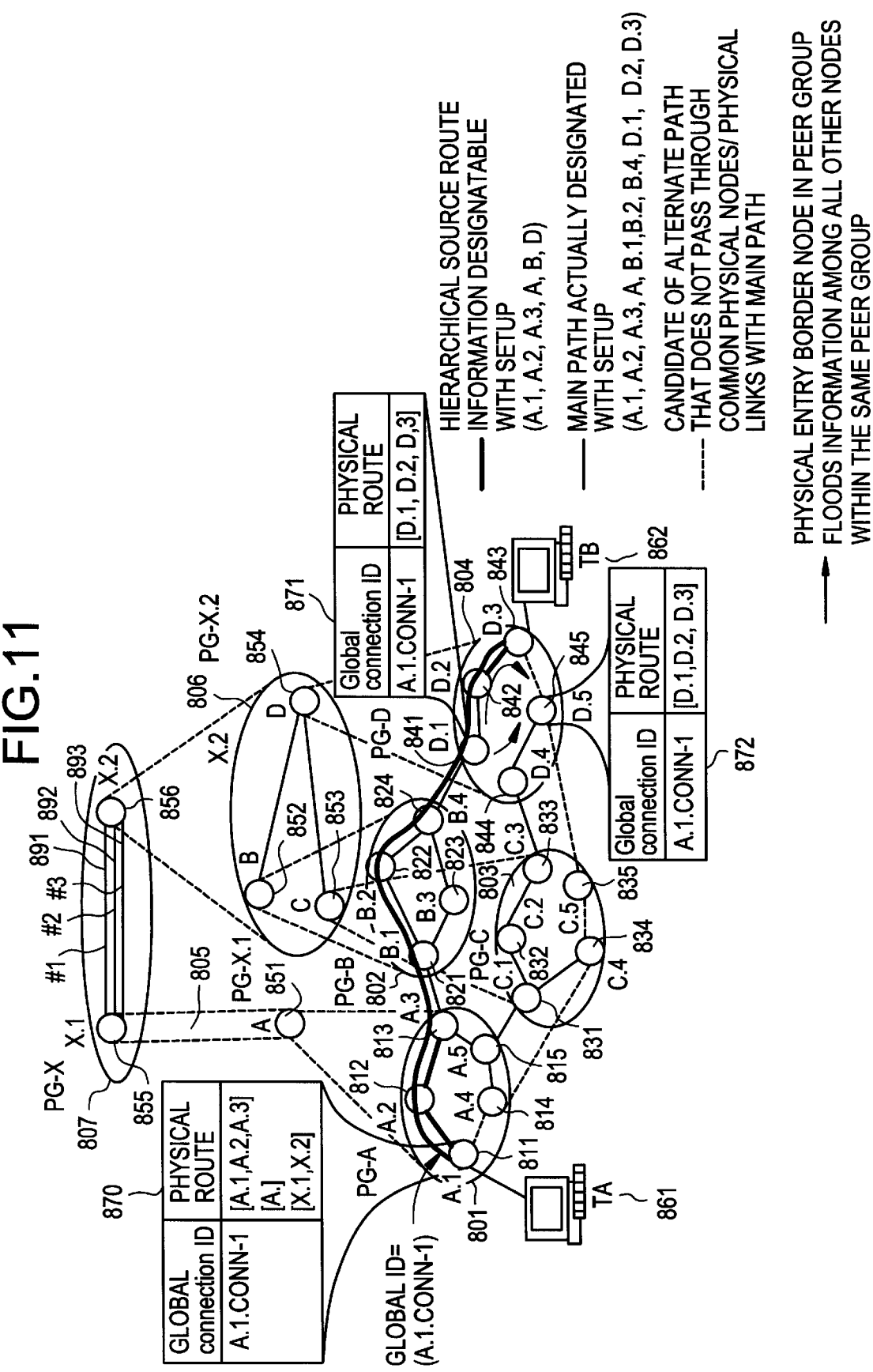
FIG. 11 is a view for use in describing routing operation carried out by the failure restoration system in FIG. 2 according to the second embodiment of the present invention.
Figure 12:
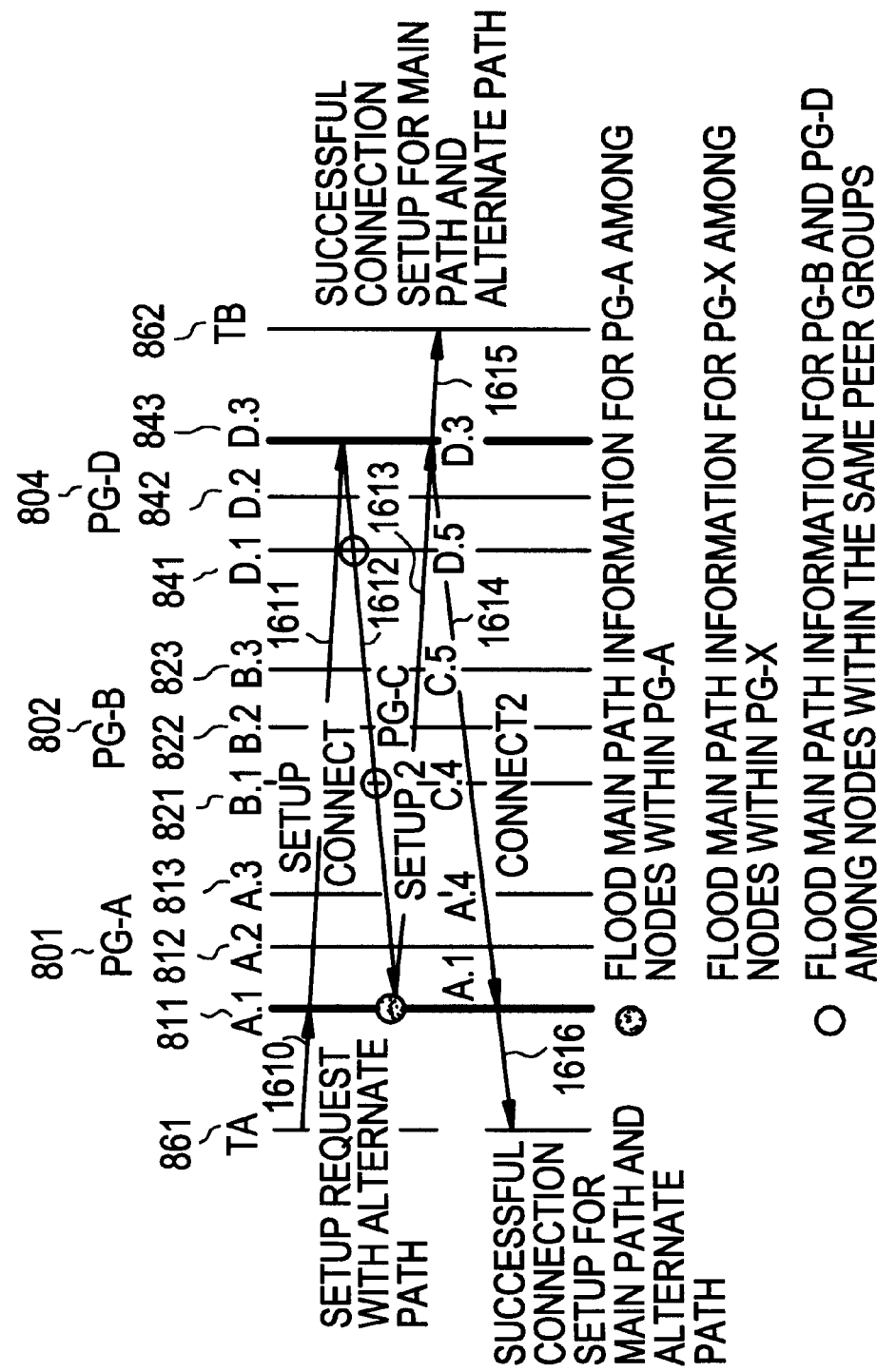
FIG. 12 is a chart for use in describing a flow of a control message during the routing operation described in conjunction with FIG. 11.

Referring to FIGS. 11 and 12, routing operation according to the second embodiment of the invention is described. FIG. 12 illustrates a flow of a SETUP signaling message for setting up a connection throughout the network in FIG. 11. An example illustrated in FIG. 11 is different from the embodiment in FIG. 1 from the viewpoint of hierarchical classification of the network. The construction of and physical interconnectivity among peer groups PG-A through PG-D (801 through 804) in FIG. 11 are similar to those described in conjunction with FIG. 1. A terminal TA (861) and a terminal TB (862) are also same as the terminal TA (761) and the terminal TB (762), respectively. The hierarchy is divided into three levels to exchange topology information among the peer groups. A physical node A (851) within a peer group PG-X.1 (805) is a representative logical node of a peer group PG-A (801). Likewise, logical nodes B (852), C (853), and D (854) within a peer group PG-X.2 (806) are representative logical nodes of peer groups PG-B (802), PG-C (803), and PG-D (804), respectively. A peer group PG-X (807) at the highest level has two representative nodes X.1 (855) and X.2 (856). The representative node X.1 (855) is the representative node for the peer group PG-X (805) while the representative node X.2 (856) is the representative node for the peer group PG-X (806). The representative node X.1 (855) is interconnected to the representative node X.2 (856) via a physical link and a corresponding logical link. A link 891 interconnects a physical node A.3 (813) and a physical node B.1 (821). A link 892 interconnects a physical node A.5 (815) and a physical node C.1 (831) while a link 893 interconnects a physical node A.4 (814) and a physical node C.4 (834).

The SETUP signaling message in the first embodiment is added with the complete source route information for the main path between the source and the destination terminals to search for the alternate path that does not join up with the main path. On the contrary, the second embodiment realizes the object with the following four functions.

(1) A connection ID is assigned to the main path such that the main path becomes unique and is distinguishable within the network. The connection ID is added to the SETUP signaling message. The connection ID may be realized by, for example, a combination of an ATM address of the physical node at the first stage with a local connection ID within the same physical node at the first stage.

(2) For the setting up of the connection for the main path, the physical node at the first stage within the peer group on the main path computes source route information to allow passage through the peer group where it locates. That physical node at the first stage updates the hierarchical source route information for use in routing to the destination terminal. Upon this update, the physical node stores a pair of the computed hierarchical source route information and the connection ID of the main path.

(3) Upon completion of the setting up of the connection for the main path, the pair of the hierarchical source route information and the connection ID of the main path, that is stored in the physical node at the first stage within the peer group on the main path, is flooded among all other physical nodes within the same peer group.

(4) For computing the alternate path, the connection ID of the main path is added to the SETUP signaling message. The alternate path that does not join up with the main path is computed in accordance with the source route information for the main path received by the physical node at the first stage within the peer group on the alternate path.

The above-mentioned extended functions are described more in detail below with reference to FIGS. 11 and 12. In FIG. 12, it is assumed that the terminal TA (861) sets up the connection with the terminal TB (862) for the main path with a connection setup request with the alternate path (operation 1610). The physical entry border node A.1 (811) to which the terminal TA (861) is connected directly determines the connection ID of the main path such as A.1.CONN-1. More specifically, the physical node A.1 (811) determines the connection ID by means of combining the ATM address of that physical node and the local connection ID within the physical node at the first stage. The connection ID is added to the SETUP signaling message. The physical node A.1 (811) then determines the main path to the destination terminal TB (862) as [A.1, A.2, A.3][A][X.1, X.2] and transfers the SETUP signaling message to the physical node at the adjacent neighbor stage. Calculation is made to complement the route every time when the message passes through the physical node at the first stage within different peer groups. The SETUP signaling message is transferred in the order of A.1, A.2, A.3, B.1, B.2, B.3, and D.1 to the destination terminal TB (862) (operation 1611).

During setting up of the connection, the physical nodes A.1 (811), B.1 (821), and D.1 (841) at the first stage within the respective peer groups on the main path illustrated in FIG. 11 compute the hierarchical source route for routing to the destination terminal TB (862). The physical nodes A.1 (811), B.1 (821), and D.1 (841) each stores the pair of the computed hierarchical source route information and the connection ID of the main path. For the physical node D.1 (841) for example, the pair is stored as illustrated in a database (871). The pair of the hierarchical source route information and the connection ID of the main path may be called main path hierarchical source route database information.

Subsequently, a physical exit border node D.3 (843) at the last stage on the main path produces a response indicating that the connection is successfully set up (operation 1612). The physical nodes A.1 (811), B.1 (821), and D.1 (841) at the first stage within all peer groups on the main path flood or advertise the pair of the hierarchical source route information and the connection ID of the main path among the remaining physical nodes within the peer groups PG-A (801), PG-B (802), and PG-C (803), respectively. For the physical node D.1 (841) for example, the main path hierarchical source route database information in the database 871 is advertised among the remaining physical nodes within the peer group PG-D (804) As a result, a physical node D.5 (845), for example, receives the main path hierarchical source route database information and stores it in a database (872).

Subsequently, the connection ID of the main path and the hierarchical source route information are used to choose the alternate path that does not pass through the physical nodes/physical links on the main path.

The physical entry border node A.1 (811) to which the terminal TA (861) is connected directly, obtains the hierarchical route information for the main path, I.e., [A.1, A.2, A.3][A][X.1, X.2]. The physical node A.1 (811) computes the alternate path that does not join up with the main path based on a hierarchical PNNI topology of its own. In the peer group PG-X (807), the main path is [X.1, X.2] and uses a link (891) between the X.1 and X.2. Therefore, the alternate path should be a link that does not join up with the link (891) between X.1 and X.2 For example, a link (893) is used as the alternate path. The link 893 has a port number #3 of a logical node PG-X.1 (855). To set up a route, the port number should be designated along with the node(s). Accordingly, the route is designated as [X.1 (#3), X.2]. For the peer group PG-X.1 (805) the alternate path is [A] which is the same as the main path. For the peer group PG-A (801), the route [A.1, A.4] is selected for routing the physical links between A.4 and C.4, corresponding to the port number #3 of the peer group PG-X.1 (801).

The above-mentioned results provide a hierarchical alternate path of [A.1, A.4][A][X.1 (#3), X.2]. The physical node A.1 (811) adds the hierarchical alternate path information of [A.1, A.4][A][X.1 (#3), X.2] to the SETUP signaling message. The physical node A.1 (811) also adds the connection ID of the main path to the SETUP signal for the connection setup (operation 1613).

The main path does not pass through the peer group PG-C (803) on the trunk route. Accordingly, no problems are in the computation of a route through the peer group PG-C (803) to the peer group PG-D (804). However, it is necessary to find the alternate path that does not join up with the route through the peer group PG-D (804) from the physical entry border node D.1 (841) to the physical exit border node D.3 (843) to which the destination terminal TE (862) is connected. The physical node D.5 (845) within the peer group PG-D (804) refers the SETUP signaling message and obtains the connection ID of the main path. In addition, the physical node D.5 (845) refers the database (872) and discovers that the main path goes through the physical nodes D.1 (841) and D.2 (842), the physical link between the physical nodes D.1 (841) and D.2 (842), and the physical link between the physical nodes D.2 (842) and the D.3 (843). The physical node D.5 (845) computes the route that does not join up with the main path The physical node D.5 (845) then selects the route of [D.5, D.3] as the alternate path rather than the route of [D.5, D.4, D.1, D.2, D.3]. In this manner, the signaling allows to establish the alternate path that does not join up with the main path.

The physical node D.3 (843) supplies the SETUP signaling message to the destination terminal TB (862) when the SETUP signaling message reaches the physical node D.3 (843) in the destination. The physical node D.3 (843) thus notifies the destination terminal TB (862) of successful connection setup of both the main and the alternate paths (operation 1615). At the same time, the physical node D.3 (843) sends the CONNECT message to the physical node A.1 (811) (operation 1614). In response to the reception of the CONNECT message, the physical node A.1 (811) notifies the terminal TA (861) of the establishment of both the main and the alternate paths (operation 1616). The above-mentioned procedure sets up the main path and the alternate path that does not join up with the alternate path.

Figure 13:
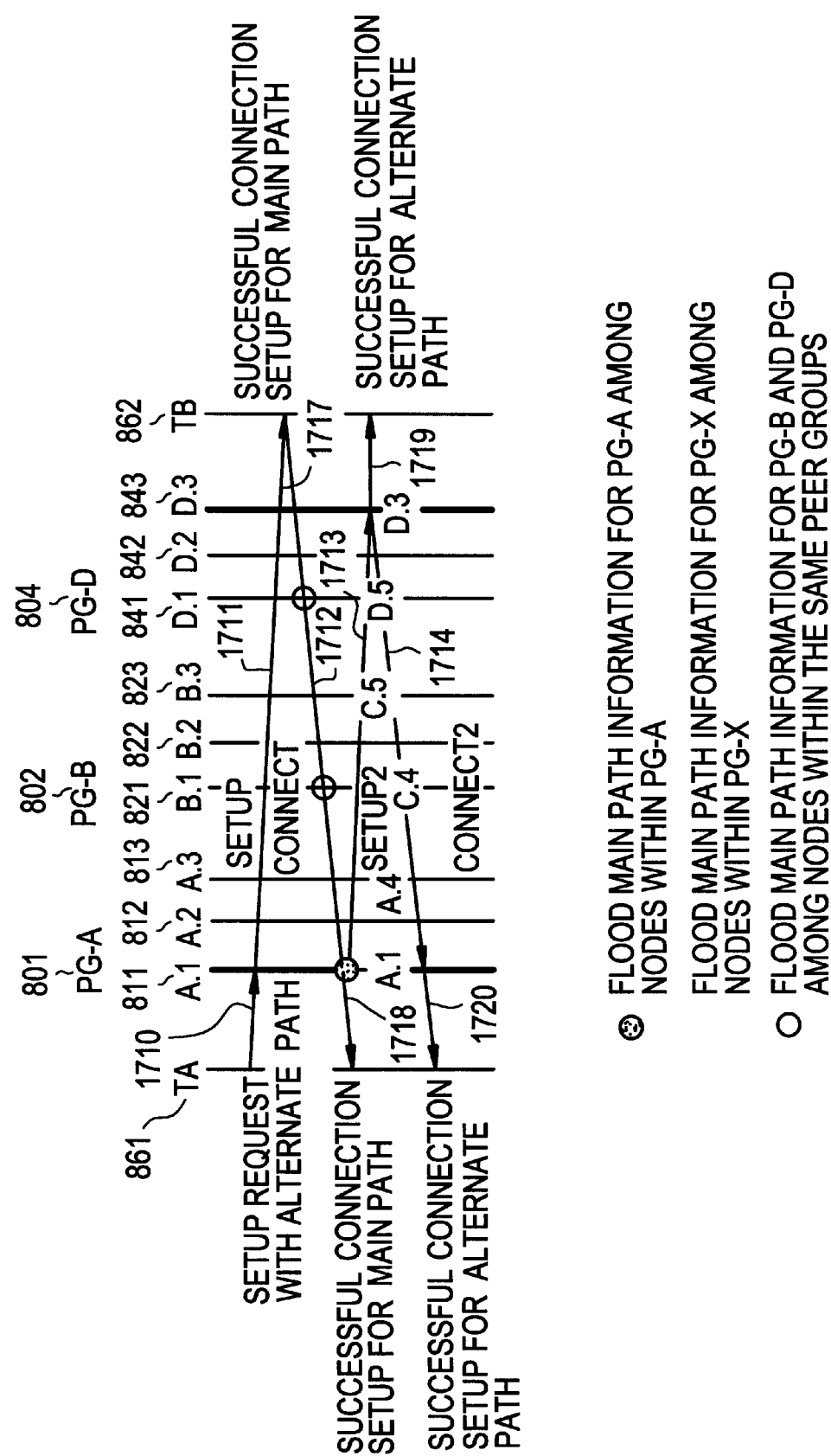
FIG. 13 is a chart similar to FIG. 12, which illustrates another flow of the control message.

In the embodiment illustrated in FIG. 12, the terminal TA (861) and the terminal TB (862) are notified of the establishment of the routes at the time of successful connection setup for the both. However, as shown in FIG. 13, the terminal TA (861) and the terminal TB (862) may be notified that the main path has been established (operations 1717 and 1718) at the timing of successful connection setup (operations 1711 and 1712) and are then notified that the alternate path has been established (operations 1719 and 1720) at the timing of successful connection setup (operations 1713 and 1714). In this embodiment, the terminal TA (861) can communicate with the peer groups, provided that switching, upon failure on the main path, to the alternate path takes a longer time after the connection has set up for the main path but not for the alternative pathe. This modification is advantageous for applications that are strict to a delay of connection setup.

Figure 14:
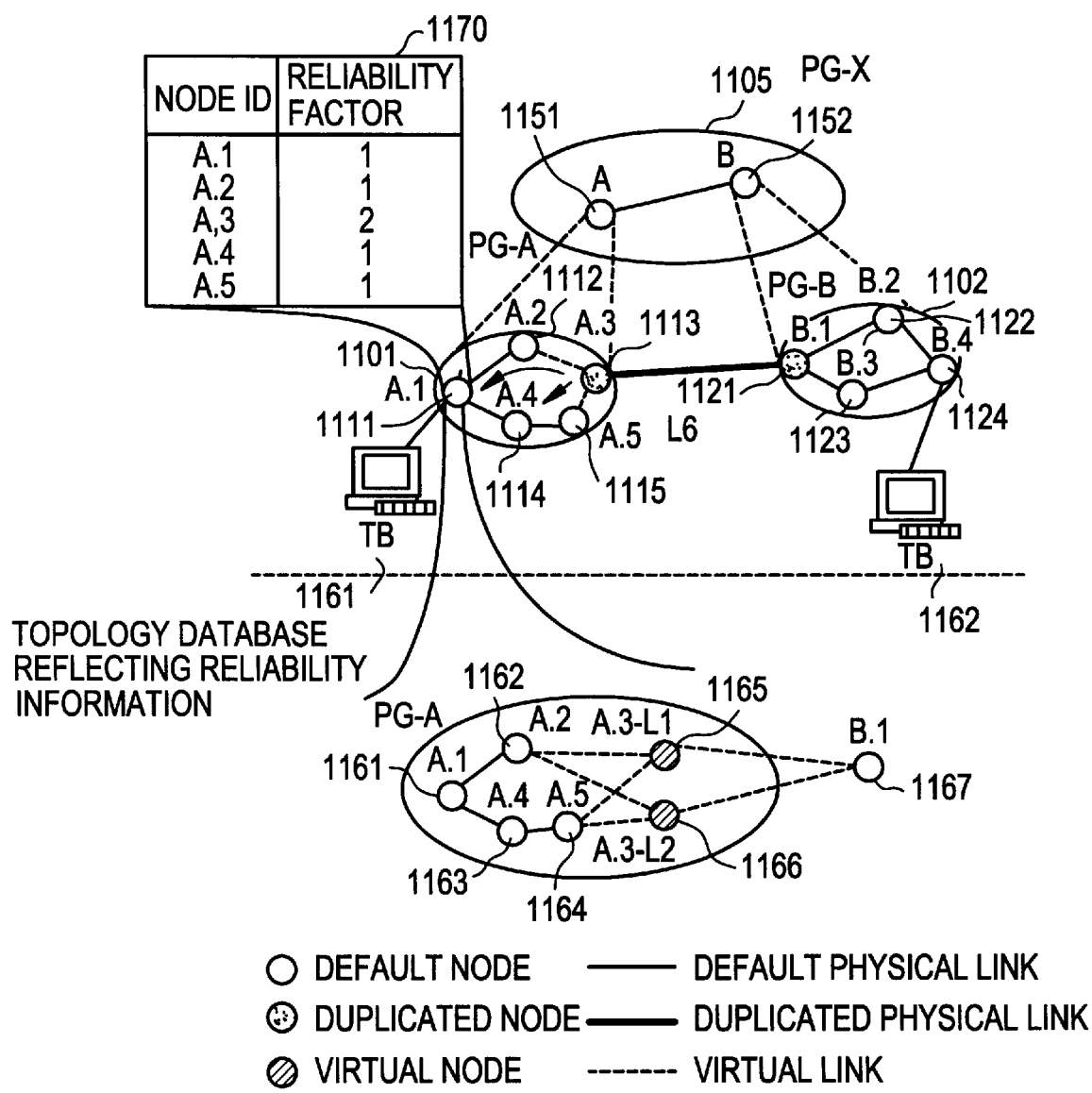
FIG. 14 is a chart for use in describing a flow of a control message during the routing operation described in conjunction with FIG. 4 according to the third embodiment of the present invention.

Referring to FIG. 14, routing operation according to the third embodiment of the invention is described. FIG. 14 shows only peer groups PG-A (1001) and PG-B (1002) out of those illustrated in FIGS. 1 and 11 for the purpose of clarifying features of the present invention. In FIG. 14, the peer groups PG-A (1001) and PG-B (1002) are associated with a common peer group PG-X (1005). In this embodiment, a physical exit border node A.3 (1113), a physical entry border node B.1 (1121), and a physical link between A.3 and B.1 are assumed to be completely duplicated physical nodes/physical link. The physical node A.3 (1113) floods or advertises reliability information indicating that the reliability factor of the physical node A.3 itself and its associated physical link is 2 among all other nodes within the same peer group. Likewise, the physical node B.1 (1121) floods or advertises reliability information indicating that the reliability factor of the physical node B.1 itself and its associated physical link is 2 among all other nodes within the same peer group. The reliability information indicative of the reliability factor of 2 means that the main path may be shared with an alternate path, with the assumption that the reliability is usually 1. In the embodiment illustrated in FIG. 14, the reliability information is in a reliability database (1170) in a physical node A.1 (1111) that has received information advertised by the physical node A.3 (1113) within the peer group PG-A (1101).

The physical entry border node A.1 (1111) reflects both the contents in the PNNI topology database and the reliability database (1170). The physical node A.1 (1111) divides virtually the duplicated physical node A.3 (1113) Into two logical virtual nodes A.3-L1 (1165) and A.3-L2 (1166). Furthermore, the physical node A.1 (1111) divides a duplicated link L6 between the physical nodes A.3 and B.1 into two virtual links A.3-L1-B.1 and A.3-L2-B.1. The above-mentioned procedure allows the nodes to discover the topology by means of virtually substituting the duplicated physical nodes/physical links into normal nodes/links. Such topology is called virtual topology information. For example, the main path may be [A.1, A.2, A.3-L][B.1, . . . ] according to the virtual topology information for the main path of [A.1, A.2, A.3][B.1, B.2, B.4]. At that time, the alternate path may be [A.1, A.4, A.5, A.3-L2][B.1, . . . ] with all the nodes and links on the alternate path are not common with those on the main path. The virtual topology information is then degenerated again into the physical topology information. As a result, the alternative path is established as [A.1, A.4, A.5, A.3][B.1, . . .] on the physical topology. The above-mentioned technique provides the alternate path sharing only highly reliable physical nodes/physical links with the main path.

Referring to FIG. 15, a modification of the routing operation in FIG. 14 is described. This modification is a combination of the procedures in FIGS. 1 and 14. In FIG. 15, a physical exit border node A.3 (913), a physical entry border node B.1 (921), and a physical link between A.3 and B.1 are assumed to be duplicated physical nodes/physical link. Alternatively, a physical exit border node B.4 (924), a physical entry border node D.1 (941), and a physical link between B.4 and D.1 may be duplicated physical nodes/ physical link.

In order to set up the connection for the alternate path to the main path, the physical entry border node A.1 (911) to which a terminal TA (961) is connected directly looks for a candidate of the alternate path. To this end, the physical node A.1 (911) uses the hierarchical PNNI topology information in itself, a reliability database (970), and the complete source route information for the main path, [A.1, A.2, A.3][B.1, B.2, B.4]. The remaining steps are similar to those described in conjunction with the first embodiment. As a result, the alternate path shares the duplicated physical nodes/physical links with the main path. The portions of the alternate path that are not the duplicated physical nodes/physical links are selected so as not to join up with the main path.

Referring to FIG. 16, another modification of the routing operation in FIG. 14 is described. This modification is a combination of the procedures in FIGS. 11 and 14. In FIG. 16, a physical exit border node A.3 (1013), a physical entry border node B.1 (1021), and a physical link between A.3 and B.1 are assumed to be duplicated physical nodes/physical link. Alternatively, a physical exit border node B.4 (1024), a physical entry border node D.1 (1041), and a physical link between B.4 and D.1 may be duplicated physical nodes/ physical link. In order to set up the connection for the alternate path to the main path, the physical entry border node A.1 (1011) to which a terminal TA (1061) is connected directly looks for a candidate of the alternate path. To this end, the physical node A.1 (1011) uses the hierarchical PNNI topology information in itself, a reliability database (1070), and a database (1071) containing the main path hierarchical source route information. The remaining steps are similar to those described in conjunction with the third embodiment. As a result, the alternate path shares the duplicated physical nodes/physical links with the main path. The portions of the alternate path that are not the duplicated physical nodes/physical links are selected so as not to join up with the main path.

Similarities and differences in control flows for the first and the second embodiments are described below by using a flow chart. The third through the fifth embodiments are similar to the first and the second embodiments except that the reliability database is used to compute the alternate path. Therefore, description of the operation is omitted for the third through the fifth embodiments.

Figure 17:
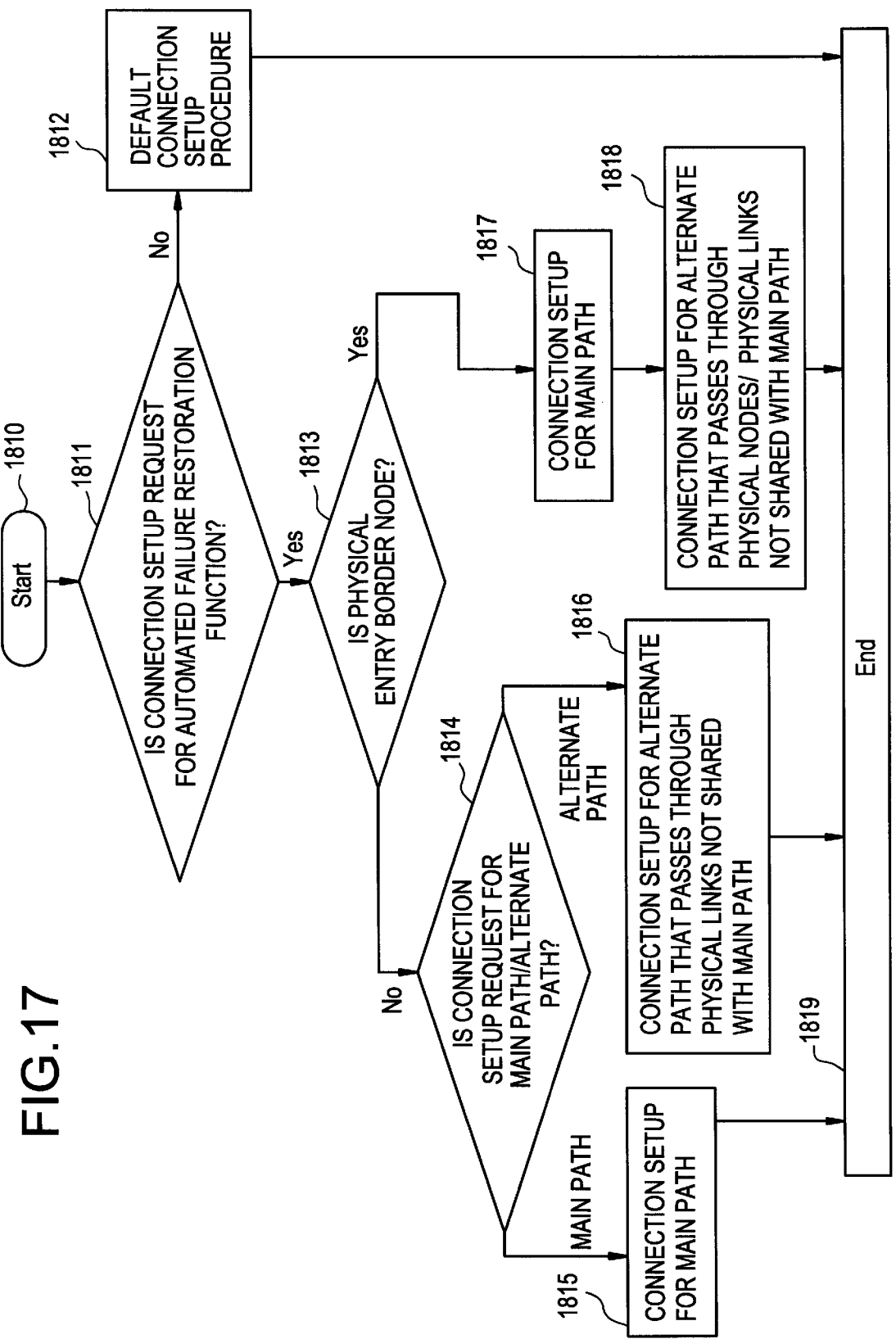
FIG. 17 is a flow chart for use in describing routing operation for setting up connections through a main path and an alternate path.

FIG. 17 is a flow chart for use in describing a process that varies depending on the location of a physical node within a peer group. Step 1811 is carried out to determine whether a connection setup request from the terminal is an automated failure restoration function request to set up the main and the alternate paths simultaneously. If it is not, the step 1811 goes to step 1812. The step 1812 is carried out to for a default connection procedure to set up only the main path. Then, the step 1812 goes to step 1819 where the operation is terminated.

On the other hand, if the connection setup request is the automated failure restoration function request, then step 1813 is carried out. The step 1813 checks whether a physical node is an entry border node. If the step 1813 is positive, then step 1817 is carried out to set up the connection for the main path. Subsequently, step 1818 is carried out to set up the connection for an alternate path that shares no physical nodes/physical links with the main path. If the step 1813 is negative indicating that the physical node is not the entry border node, then step 1814 is carried out. The step 1814 determines whether the connection setup request is for the main path or for the alternate path. If the connection setup request is for the main path, then step 1815 is carried out to set up the connection for the main path. On the other hand, if the connection setup request is for the alternate path, then step 1816 is carried out to set up the connection for the alternate path.

Figure 18:
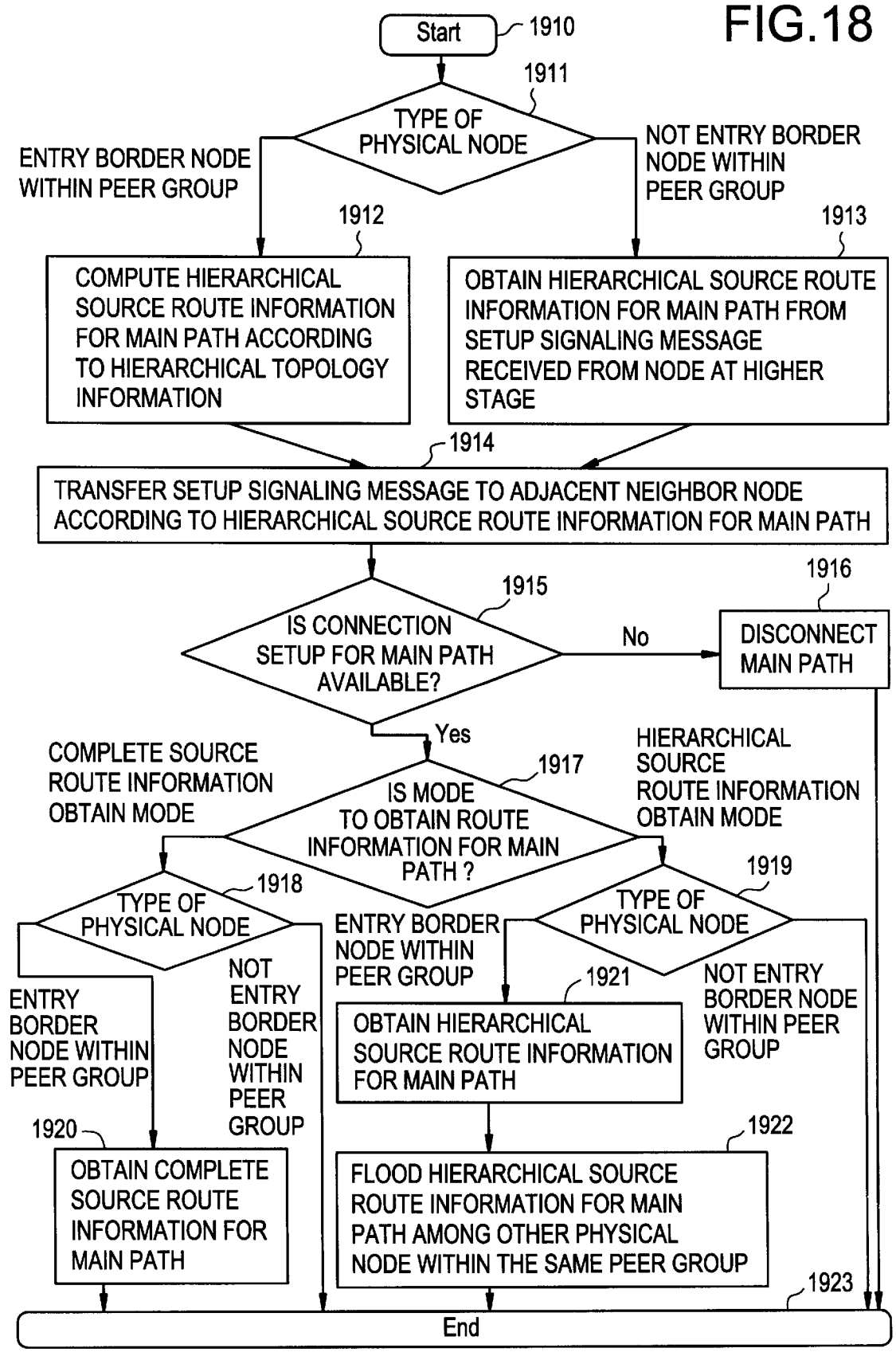
FIG. 18 is a flow chart for use in describing in detail the routing operation in FIG. 17 for setting up a connection through the main path.

Referring to FIG. 18, the procedure at the steps 1815 and 1817 in FIG. 17 is described more in detail. The description is particularly concentrated on the process that varies depending on which step is applied to set up the connection for the main path as well as the process that varies depending on the location of the physical node.

First, at step 1911, the type of the physical node is checked. If the physical node is an entry border node within the peer group, then step 1912 is carried out to compute or re-compute the hierarchical source route information for the main path in accordance with the PNNI topology information. If the step 1911 determines that the physical node is not the entry border node within the peer group, then step 1913 is carried out. The step 1913 obtains the hierarchical source route information for the main path from the SETUP signaling message received from an adjacent neighbor node at a higher stage. Both the steps 1912 and 1913 go to step 1914. The step 1914 transfers the SETUP signaling message to an adjacent neighbor node at a lower stage in accordance with the hierarchical source route information for the main path obtained. Subsequently, step 1915 is carried out to determine whether the connection setup for the main path is available. If no information is provided by the CONNECT message that indicates the connection setup is completed in response to the SETUP signaling message, the connection setup for the main path is determined to be unavailable If the RELEASE message to release the connection is received, the connection setup for the main path is also determined to be unavailable. In such cases, step 1916 is carried out to disconnect the main path.

On the other hand, if the step 1915 determines that the connection setup for the main path is available, then step 1917 is carried out. The step 1917 checks a mode to obtain the route information for the main path. If it is in a mode that allows discovery of the main path with the complete source route information as described in the first embodiment, step 1918 is carried out to determine the type of the physical node. For the entry border node to which the source terminal is connected, step 1920 is carried out to obtain and stores the complete source route information for the main path from the information (CONNECT message) indicative of the completion of the connection setup. Then, step 1923 is carried out to terminate the operation. The complete source route information for the main path is used to set up the connection for the alternate path subsequently. If the step 1918 indicates that the physical node is not the entry border node, then the step 1923 is carried out to terminate the operation.

At the step 1917, if it is in a mode that the main path is managed by using a global connection ID and the hierarchical source route information is advertised or flooded throughout the network as the main path information, step 1919 checks the type of the physical node. If the step 1919 determines that the physical node is the entry border node within the peer group, then step 1921 is carried out. The step 1921 obtains the hierarchical source route information for the main path that is stored for every connection setup request. Then, the step 1921 goes to step 1922. The step 1922 advertises or floods a pair of the connection ID of the main path and the hierarchical source route information for the main path among all other physical nodes within the same peer group. Then, the step 1923 is carried out to terminate the operation. The above mentioned pair of information is used for the subsequent connection setup for the alternate path. If the step 1919 indicates that the physical node is not the entry border node within the peer group, the step 1923 is carried out to terminate the operation.

Figure 19B:
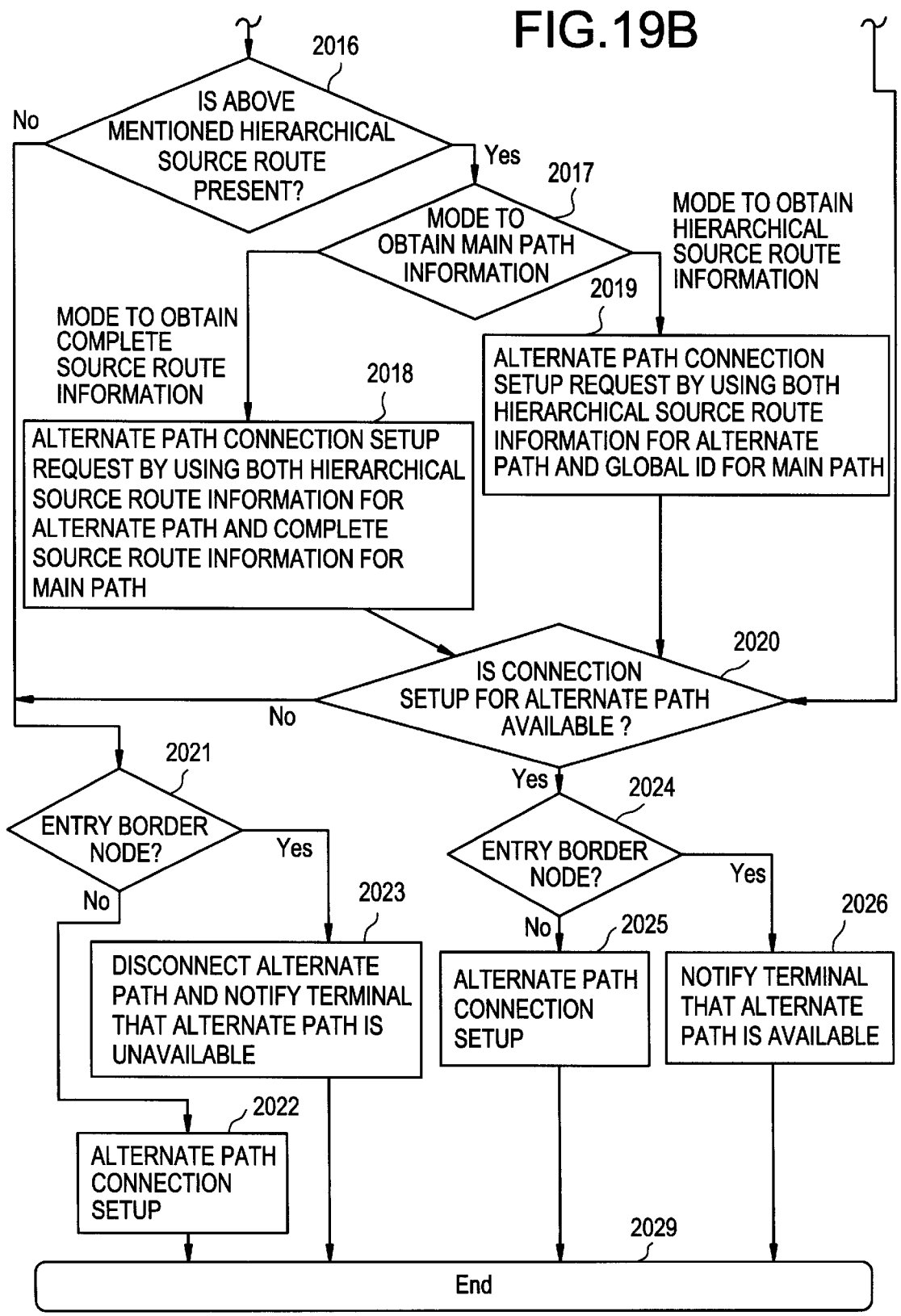
FIG. 19 is a flow chart for use in describing in detail the routing operation in FIG. 17 for setting up a connection through the alternate path.

Referring to FIG. 19, the procedure at the steps 1816 and 1818 in FIG. 17 is described more in detail. The description is particularly concentrated on the process that varies depending on which step is applied to set up the connection for the alternate path as well as the process that varies depending on the location of the physical node.

First, at step 2011, the type of the physical node is checked. If the physical node is an entry border node within the peer group, then step 2012 is carried out. The step 2012 checks a mode to obtain the main path information from the SETUP signaling message. If it is in a mode that allows discovery of the main path with the complete source route information as described in the first embodiment, step 2013 is carried out to obtain the complete source route information for the main path. On the other hand, the step 2012 indicates that it is in a mode that manages the main path with the connection ID and the hierarchical source route information is advertised or flooded over the network as the main path information as described in conjunction with the second embodiment, step 2014 is carried out. The step 2014 obtains the connection ID of the main path and obtains the hierarchical main path information corresponding to the connection ID according to the flooded information.

At step 2015, a route is selected by using the main path information obtained at the steps 2013 and 2014. More specifically, it selects the route such that the main path obtained and the route within the peer group where it locates are not the same as the alternate path to the destination in the PNNI topology information that it has. Subsequently, the route is selected such that the main path obtained and the route within the peer group at a higher level overlap as less as possible. In this manner, the hierarchical source route information for the alternate path is obtained.

At step 2016, it is checked whether the hierarchical source route information is present for the alternate path at step 2015. If there is no hierarchical source route information for the alternate path, step 2021 checks whether the node is the entry border node. If it is the entry border node, then step 2023 is carried out to disconnect the alternate path. The step 2023 then notifies the terminal that no alternate path is available. On the other hand, if the step 2021 determines that the physical node is not the entry border node, then step 2022 is carried out to merely disconnect the alternate path.

If the step 2016 determines that there is the hierarchical source route information for the alternate path, then step 2017 is carried out to check a mode to obtain the main path information. If it is in a mode that allows discovery of the main path with the complete source route information, step 2018 is carried out to set up the connection for the alternate path. To this end, the step 2018 uses the hierarchical source route information for the alternate path and the complete source route information for the main path. At that time, the SETUP signaling message is transferred to the next adjacent stage. On the other hand, if the step 2017 determines it is in a mode that the main path is managed by using the connection ID and the hierarchical source route information is advertised or flooded throughout the network as the main path information, step 2019 is carried out to set up the connection for the alternate path. To this end, the step 2018 uses the hierarchical source route information for the alternate path and the complete source route Information for the main path.

Then, step 2020 is carried out to determine whether the connection setup for the alternate path is available. If the connection setup for the alternate path is determined to be unavailable, the above-mentioned step 2021 is carried out. On the other hand, if the step 2020 determines that the connection setup for the alternate path is available, then step 2024 is carried out to determine whether the physical node is the entry border node or the exit border node. If it is the entry border node, then step 2026 is carried out to notify the terminal that the alternate path can be occupied. Then, step 2029 is carried out to terminate the operation. On the other hand, if the step 2024 determines that the physical node is not the entry border node, then step 2025 is carried out to set up the connection for the alternate path. Then, the step 2029 is carried out to terminate the operation.

If the physical node is not the entry border node within the peer group at the step 2011, then step 2027 is carried out The step 2027 obtains the source route information for the alternate path that is designated by the SETUP signaling message from the physical node at a higher stage Step 2028 carries out routing operation according to the designation by the source route information for the alternate path to transfer the SETUP signaling message to the physical node at the adjacent lower stage. The operation proceeds to the step 2020.

As described above, the alternate path selection unit according to the present invention has following advantages. The primary advantage is applicability to a large scale hierarchical network The reasons are as follows. The network is hierarchically configured and divided into a number of subnetworks for exchanging dynamic routing information throughout the large scale network. This permits discovery of precise topology information by a local domain. However, the topology information is described only in a rough hierarchical manner for other domains and the routing information is thus significantly compressed. Therefore, the main path can only be set up roughly when based on such a routing protocol. Taking the above into consideration, the present invention obtains the complete main path information from the source physical node to the destination physical node. Alternatively, the present invention carries out flooding a part of the main path information (hierarchical source route information). In this way, the information about the main path can be discovered. As a result, the main path information obtained in the manner described above can be used to set up an alternate path. This provides the alternate path that does not pass through the physical nodes/physical links on the main path.

The secondary advantage Is flexible routing for the alternate path depending on the reliability of the physical nodes/physical links. The reasons are as follows. The reliability database is provided in the physical nodes/physical links where the reliability information is defined. The reliability information is flooded throughout the network. This permits only a highly reliable physical node/physical link to be shared between the main and the alternate paths. The remaining portion of the alternate path is determined such that it does not join up with the main path.

What is claimed is:

1. A failure restoration system comprising distributed hierarchical routing means capable of exchanging, in a distributed and hierarchical manner, link state parameters between nodes in a connection-oriented network having a plurality of subnetworks, the link state parameter including information about a bandwidth of a link and delay to discover a hierarchical topology, the routing means being adapted to set up a main path and previously determine an alternate path for the main path, wherein:

the failure restoration system further comprises alternate path selection means adapted to obtain complete source route information for the main path when it attempts to set up the main path, said alternate path selection means adding the complete source information to a SETUP signaling message for setting up the alternate path, thereby providing said alternate path as much different as possible from the main path.

2. A failure restoration system as claimed in claim 1, wherein said alternate path selection means comprises:

link state routing protocol means for exchanging the link state parameters in a distributed and hierarchical manner among nodes;

a link state database for storing hierarchical topology information obtained by said link state routing protocol means and information about quality of communication via links and nodes;

signaling means for obtaining, to set up a connection for the main path, the complete source route information after reception of a message indicating that the connection setup is completed, to notify main path discovery means of the completion of the connection setup, the signaling means also storing the complete source route information obtained into a main path database; and alternate path computing means for computing, when said signaling means attempts to set up the alternate path for the main path, a hierarchical alternate path that passes through the physical nodes/physical links different from those on the main path according to said link state database and said main path database;

the hierarchical alternate path being designated to the SETUP signaling message, the SETUP signaling message being added with the complete source route information for setting up the connection, thereby setting up said alternate path as much different as possible from the main path.

3. A failure restoration system comprising distributed hierarchical routing means capable of exchanging, in a distributed and hierarchical manner, link state parameters between nodes in a connection-oriented network having a plurality of subnetworks, the link state parameters including information about a bandwidth of a link and delay to discover a hierarchical topology, the routing means being adapted to set up a main path and previously determine an alternate path for the main path, wherein:

the failure restoration system further comprises alternate path selection means adapted to flood a combination of hierarchical source route information for the main path assigned for each subnetwork and a unique connection ID for identification of the main path throughout the network, among all nodes other than the flooding source node within the same subnetwork for each subnetwork on the main path when it attempts to set up the main path, said alternate path selection means also being adapted to add the connection ID of the main path to a SETUP signaling message for setting up the alternate path, thereby providing said alternate path as much different as possible from the main path.

4. A failure restoration system as claimed in claim 3, wherein said alternate path selection means comprises:

link state routing protocol means for exchanging the link state parameters in a distributed and hierarchical manner among nodes;

a link state database for storing hierarchical topology obtained by said link state routing protocol means and information about quality of communication via links and nodes;

signaling means for setting up a connection for the main path by using the unique connection ID for identification of the main path throughout the network;

main path discovery means for flooding, after reception of a message indicating that the connection setup is completed, a combination of the hierarchical source route information for the main path and the connection ID of the main path for each subnetwork on the main path, thereby exchanging hierarchical main path information to obtain the main path information;

a main path database for storing the main path information obtained; and alternate path computing means for computing, when said signaling means attempts to set up the alternate path for the main path, a hierarchical alternate path that passes through the physical nodes/physical links different from those on the main path according to information stored in said link state database and in said main path database;

the hierarchical alternate path being designated to the SETUP signaling message, the SETUP signaling message being added with the connection ID for the main path for setting up the connection, thereby setting up said alternate path as much different as possible from the main path.

5. A failure restoration system comprising distributed hierarchical routing means capable of exchanging, in a distributed and hierarchical manner, link state parameters between nodes in a connection-oriented network having a plurality of subnetworks, the link state parameters including information about a bandwidth of a link and delay to discover a hierarchical topology, wherein:

each node comprises alternate path selection means that floods or advertises, among other nodes, the link state parameters with the addition of a reliability factor obtained depending on a degree of reliability of nodes/links, thereby selecting a route based on the reliability factor.

6. A failure restoration system as claimed in claim 5, wherein said alternate path selection means comprises:

link state routing protocol means for exchanging the link state parameters in a distributed and hierarchical manner among nodes;

a link state database for storing hierarchical topology information obtained by said link state routing protocol means and information about quality of communication via links and nodes;

reliability discovery means for obtaining reliability information by means of exchanging, among nodes, the link state parameters with the addition of the reliability factor;

a reliability database for storing the reliability information obtained; and alternate path computing means;

said alternate path computing means having logical topology generating means for generating a logical topology depending on the reliability factor, in accordance with information stored in said link state database and information stored in said reliability database, said alternate path computing means selecting a route based on the logical topology.

7. A failure restoration system as claimed in claim 5, wherein said alternate path selection means is for setting up an alternate path for the main path after the main path has established, said alternate path selection means being adapted to obtain complete source route information for the main path when it attempts to set up the main path, said alternate path selection means adding the complete source information to a SETUP signaling message for setting up the alternate path, thereby providing a physical alternate path as much different as possible from the main path.

8. A failure restoration system as claimed in claim 7, wherein said alternate path selection means comprises:

reliability discovery means for obtaining reliability information by means of exchanging, among nodes, the link state parameters with the addition of the reliability factor;

a reliability database for storing the reliability information obtained;

a main path database for storing the complete source route information for the main path;

alternate path computing means having logical topology generating means for generating a logical topology depending on the reliability factor, in accordance with information stored in said link state database and information stored in said reliability database; logical alternate path computing means for obtaining the main path information from said main path database to compute a logical alternate path that passes through physical nodes/physical links different from those on the main path; and physical alternate path computing means that degenerates the logical alternate path into the physical path; and signaling means for designating the physical hierarchical alternate path to the SETUP signaling message and adding to the SETUP signaling message the complete source route information for the main path for setting up the connection, thereby setting up a physical alternate path as much different as possible from the main path.

9. A failure restoration system as claimed in claim 5, wherein said alternate path selection means is for setting up an alternate path for the main path after the main path has established, said alternate path selection means being adapted to flood a combination of hierarchical source route information for the main path assigned for each subnetwork and a unique connection ID for identification of the main path throughout the network, among all nodes other than the flooding source node within the same subnetwork for each subnetwork on the main path when it attempts to set up the main path, said alternate path selection means also being adapted to add the connection ID of the main path to a SETUP signaling message for setting up the alternate path, thereby providing a physical alternate path as much different as possible from the main path.

10. A failure restoration system as claimed in claim 9, wherein said alternate path selection means comprises:

reliability discovery means for obtaining reliability information by means of exchanging, among nodes, the link state parameters with the addition of the reliability factor;

a reliability database for storing the reliability information obtained;

a main path database for storing the hierarchical main path information;

alternate path computing means having logical topology generating means for generating a logical topology depending on the reliability factor, in accordance with information stored in said link state database and Information stored in said reliability database; logical alternate path computing means for obtaining the hierarchical main path information from the information stored in said main path database by means of designating the connection ID of the main path, to compute a logical alternate path that passes through physical nodes/physical links different from those on the main path; and physical alternate path computing means that degenerates the logical alternate path into the physical path; and signaling means for designating the physical hierarchical alternate path to the SETUP signaling message and adding to the SETUP signaling message the connection ID of the main path for setting up the connection, thereby setting up a physical alternate path as much different as possible from the main path.

\* \* \* \* \*

UNITED STATES PATENT AND TRADEMARK OFFICE
CERTIFICATE OF CORRECTION

PATENT NO. : 6,026,077
DATED : February 15, 2000
INVENTOR(S) : Atsushi Iwata

It is certified that error appears in the above-indentified patent and that said Letters Patent is hereby corrected as shown below:

Column 7, line 11 delete "lion", insert --join--

Column 13, line 62 delete "TE", insert --TB--

Column 15, line 11 after "A.3-L" insert --1--

Signed and Sealed this

Twentieth Day of March, 2001

Attest:

NICHOLAS P. GODICI

Attesting Officer     Acting Director of the United States Patent and Trademark Office